US010587692B2

(12) United States Patent
Lin et al.

(10) Patent No.: US 10,587,692 B2
(45) Date of Patent: *Mar. 10, 2020

(54) SERVICE AND APIS FOR REMOTE VOLUME-BASED BLOCK STORAGE

(71) Applicant: Amazon Technologies, Inc., Seattle, WA (US)

(72) Inventors: Yun Lin, Bellevue, WA (US); James Christopher Sorenson, III, Seattle, WA (US); David C. Salyers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,328

(22) Filed: Nov. 9, 2018

(65) Prior Publication Data

US 2019/0082012 A1    Mar. 14, 2019

Related U.S. Application Data

(63) Continuation of application No. 15/495,784, filed on Apr. 24, 2017, now Pat. No. 10,129,337, which is a (Continued)

(51) Int. Cl.
*G06F 15/16* (2006.01)
*H04L 29/08* (2006.01)
(Continued)

(52) U.S. Cl.
CPC ............ *H04L 67/1097* (2013.01); *G06F 3/06* (2013.01); *G06F 3/065* (2013.01); *G06F 3/0605* (2013.01);
(Continued)

(58) Field of Classification Search
CPC . H04L 67/1097; H04L 67/1095; H04L 67/10; H04L 12/588; H04L 29/06;
(Continued)

(56) References Cited

U.S. PATENT DOCUMENTS 3,838,228 A    9/1974    Lee et al.
5,636,355 A    6/1997    Ramakrishnan et al.
(Continued)

OTHER PUBLICATIONS

Stephen Lawson, "Gluster Pushes Storage Software to VMware, Amazon," PCWorld on line article, Feb. 7, 2011, all pages.
(Continued)

*Primary Examiner* — Michael A Keller
*Assistant Examiner* — Thao D Duong
(74) *Attorney, Agent, or Firm* — Robert C. Kowert; Kowert, Hood, Munyon, Rankin & Goetzel, P.C.

(57) ABSTRACT

Methods, apparatus, and computer-accessible storage media for providing a volume-based block storage service and application programming interfaces (APIs) to the service. A block storage service and block storage service APIs may allow processes (applications or appliances) on the service client network to leverage remote, volume-based block storage provided by the service provider. The APIs may provide a standard interface to volume-based block storage operations on a remote data store. The service provider, the service clients, and/or third parties may develop various applications and/or appliances that may, for example, be instantiated in service clients' local networks and that leverage the block storage service via the APIs to create and manage volumes and snapshots on the remote data store and to upload and download data from the volumes and snapshots on the remote data store.

20 Claims, 16 Drawing Sheets

Related U.S. Application Data continuation of application No. 13/327,605, filed on Dec. 15, 2011, now Pat. No. 9,635,132.

(51) Int. Cl.
*H04L 29/06* (2006.01)
*G06F 3/06* (2006.01)

(52) U.S. Cl.
CPC ............ *G06F 3/067* (2013.01); *G06F 3/0652* (2013.01); *H04L 63/06* (2013.01); *H04L 63/08* (2013.01); *H04L 67/32* (2013.01); *H04L 69/04* (2013.01)

(58) Field of Classification Search
CPC ....... H04L 41/147; H04L 63/08; H04L 67/02; H04L 67/06; H04L 67/42; G06Q 30/08
See application file for complete search history.

(56) References Cited

U.S. PATENT DOCUMENTS

| | | | |
|---|---|---|---|
| 6,009,502 | A | 12/1999 | Boeuf |
| 6,097,877 | A | 8/2000 | Katayama et al. |
| 6,148,368 | A | 11/2000 | DeKoning |
| 6,216,199 | B1 | 4/2001 | Dekoning et al. |
| 6,237,072 | B1 | 5/2001 | Houlsdworth |
| 6,477,624 | B1 | 11/2002 | Kedem et al. |
| 6,516,380 | B2 | 2/2003 | Kenchammana-Hoskote et al. |
| 6,732,124 | B1 | 5/2004 | Koseki et al. |
| 6,760,379 | B1 | 7/2004 | Werner |
| 6,792,540 | B1 | 9/2004 | Smith et al. |
| 6,880,086 | B2 | 4/2005 | Kidder et al. |
| 6,925,518 | B2 | 8/2005 | Rudland et al. |
| 6,925,533 | B2 | 8/2005 | Lewis |
| 6,934,826 | B2 | 8/2005 | Lubbers et al. |
| 7,010,645 | B2 | 3/2006 | Hetzler et al. |
| 7,017,374 | B2 | 3/2006 | Bogert et al. |
| 7,093,028 | B1 | 8/2006 | Shao et al. |
| 7,191,304 | B1 | 3/2007 | Cameron et al. |
| 7,213,105 | B2 | 5/2007 | Soejima et al. |
| 7,523,286 | B2 | 4/2009 | Ramany et al. |
| 7,574,660 | B2 | 8/2009 | Campbell et al. |
| 7,676,702 | B2 | 3/2010 | Basham et al. |
| 7,752,329 | B1 | 7/2010 | Meenan et al. |
| 7,913,300 | B1 | 3/2011 | Flank et al. |
| 8,037,026 | B1 | 10/2011 | Singhal |
| 8,126,847 | B1 | 2/2012 | Zheng et al. |
| 8,200,638 | B1 | 6/2012 | Zheng et al. |
| 8,214,406 | B2 | 7/2012 | Kushwah |
| 8,275,900 | B2 | 9/2012 | Meenan et al. |
| 8,285,967 | B1 | 10/2012 | Veeraswamy et al. |
| 8,305,893 | B2 | 11/2012 | Verma et al. |
| 9,635,132 | B1 | 4/2017 | Lin et al. |
| 10,129,337 | B2 | 11/2018 | Lin et al. |
| 2001/0049773 | A1 | 12/2001 | Bhavsar |
| 2002/0169827 | A1 | 11/2002 | Ulrich et al. |
| 2003/0131207 | A1 | 7/2003 | Arakawa et al. |
| 2003/0131278 | A1 | 7/2003 | Fujibayashi |
| 2003/0221124 | A1 | 11/2003 | Curran et al. |
| 2004/0243699 | A1 | 12/2004 | Kocianes et al. |
| 2005/0013441 | A1 | 1/2005 | Klein |
| 2006/0253549 | A1 | 11/2006 | Arakawa et al. |
| 2006/0271656 | A1 | 11/2006 | Yagawa |
| 2007/0168336 | A1 | 7/2007 | Ransil et al. |
| 2008/0013614 | A1 | 1/2008 | Fiesel et al. |
| 2008/0178278 | A1 | 7/2008 | Grinstein et al. |
| 2009/0024752 | A1 | 1/2009 | Shitomi |
| 2009/0077097 | A1 | 3/2009 | Lacapra et al. |
| 2009/0077257 | A1 | 3/2009 | Savoor et al. |
| 2009/0157980 | A1 | 6/2009 | Bruce |
| 2009/0240705 | A1 | 9/2009 | Miloushev et al. |
| 2010/0057984 | A1 | 3/2010 | Chen et al. |
| 2010/0070725 | A1 | 3/2010 | Prahlad et al. |
| 2010/0162032 | A1 | 6/2010 | Dodgson et al. |
| 2010/0205152 | A1 | 8/2010 | Ansari et al. |
| 2010/0217948 | A1 | 8/2010 | Mason et al. |
| 2010/0293233 | A1 | 11/2010 | Salam et al. |
| 2010/0333116 | A1 | 12/2010 | Prahlad et al. |
| 2011/0002341 | A1 | 1/2011 | Damola et al. |
| 2011/0099147 | A1 | 4/2011 | McAlister et al. |
| 2011/0113428 | A1 | 5/2011 | Nelson et al. |
| 2011/0218969 | A1 | 9/2011 | Anglin et al. |
| 2012/0079221 | A1 | 3/2012 | Sivasubramanian et al. |
| 2012/0110055 | A1 | 5/2012 | Van Biljon et al. |
| 2012/0110569 | A1 | 5/2012 | Moore et al. |
| 2012/0203924 | A1 | 8/2012 | Dote et al. |
| 2012/0208512 | A1 | 8/2012 | Maharajh et al. |
| 2012/0259950 | A1 | 10/2012 | Havekes et al. |
| 2012/0269275 | A1 | 10/2012 | Hannuksela |
| 2012/0272285 | A1 | 10/2012 | Brooks et al. |
| 2012/0303686 | A1 | 11/2012 | Ananthanara Yanan et al. |
| 2012/0311065 | A1 | 12/2012 | Ananthanara Yanan et al. |
| 2012/0324067 | A1 | 12/2012 | Hari et al. |

OTHER PUBLICATIONS

Krishnan Subramanian, "cluster Introduces Scale-Out NAS Virtual Storage Appliances for VMware and AWS," CloudAve online article, Feb. 9, 2011, all pages.

A. Epstein, D. H. Lorenz, E. Silvera, I. Shapira, "Virtual Appliance Content Distribution for a Global Infrastructure Cloud Service," INFOCOM'10 Proceedings IEEE, Mar. 2010, all pages.

Liu, et al., "Low-cost application image distribution on worldwide cloud front server," Computer Communications Workshops (INFOCOM WKSHPS), 2011 IEEE Conference, Apr. 2011, all pages.

M. Armbrust, et al., "Above the Clouds: A Berkeley View of Cloud computing," Technical Report No. UCB/EECS-2009-28, University of California at Berkley, USA, Feb. 10, 2009, all pages.

Stephanie Balaouras, "How the Cloud Will Transform Disaster Recovery Services," Forrester Research, Inc., Jul. 24, 2009, all pages.

U.S. Appl. No. 12/981,172, filed Dec. 29, 2010, Amazon Technologies, Inc., all pages.

U.S. Appl. No. 12/981,393, filed Dec. 29, 2010, Amazon Technologies, Inc., all pages.

U.S. Appl. No. 12/981,397, filed Dec. 29, 2010, Amazon Technologies, Inc., all pages.

U.S. Appl. No. 13/212,960, filed Aug. 18, 2011, Amazon Technologies, Inc., all pages.

U.S. Appl. No. 13/174,156, filed Jun. 30, 2011, Amazon Technologies, Inc., all pages.

U.S. Appl. No. 13/174,524, filed Jun. 30, 2011, Amazon Technologies, Inc., all pages.

U.S. Appl. No. 13/174,172, filed Jun. 30, 2011, Amazon Technologies, Inc., all pages.

U.S. Appl. No. 13/174,140, filed Jun. 30, 2011, Amazon Technologies, Inc., all pages.

U.S. Appl. No. 13/174,203, filed Jun. 30, 2011, Amazon Technologies, Inc., all pages.

U.S. Appl. No. 13/174,513, filed Jun. 30, 2011, Amazon Technologies, Inc., all pages.

U.S. Appl. No. 13/174,505, filed Jun. 30, 2011, Amazon Technologies, Inc., all pages.

U.S. Appl. No. 13/174,489, filed Jun. 30, 2011, Amazon Technologies, Inc., all pages.

U.S. Appl. No. 13/324,907, filed Dec. 13, 2011, Amazon Technologies, Inc., all pages.

SERVICE AND APIS FOR REMOTE VOLUME-BASED BLOCK STORAGE

This application is a continuation of U.S. patent application Ser. No. 15/495,784, filed Apr. 24, 2017, which is a continuation of U.S. patent application Ser. No. 13/327,605, filed Dec. 15, 2011, now U.S. Pat. No. 9,635,132, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple customers by providing each customer with access to a virtualized data store which may be distributed across multiple data storage devices, with each such virtualized data store acting as a distinct logical data store that provides the customer with the illusion that they are the sole operator and administrator of the data storage resources.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Figure 1:
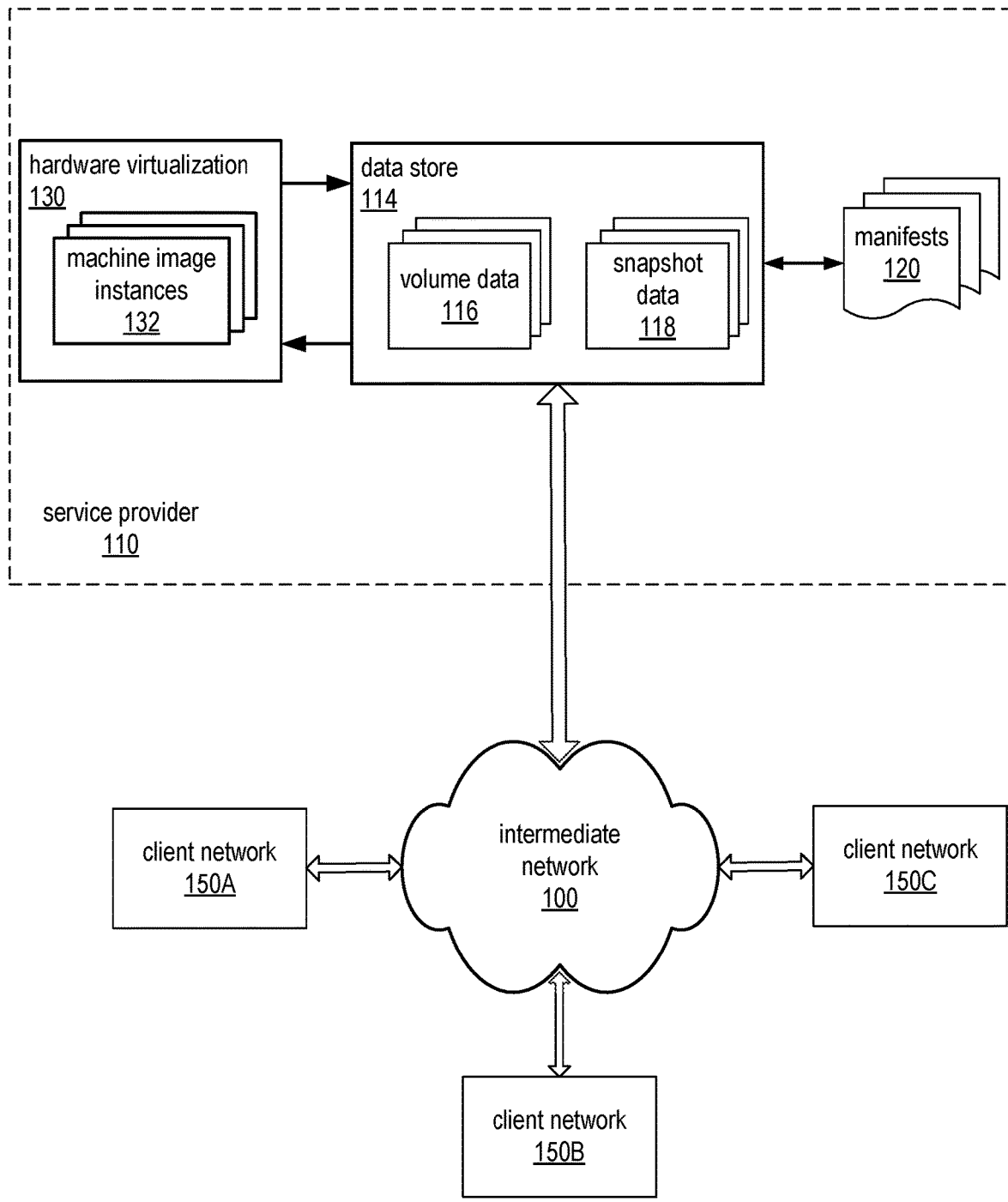
FIG. 1 is a high-level block diagram of an example network environment in which embodiments of a block storage service and APIs to the block storage service may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods, apparatus, and computer-accessible storage media for providing a service for remote, volume-based block storage and application programming interfaces (APIs) to the service are described. Embodiments of a block storage service and APIs to the block storage service are described herein in the context of a service provider that provides, over an intermediate network such as the Internet, a remote, volume-based block storage as a remote data store to clients of the service provider (referred to herein as service clients). The block storage service and APIs may be implemented on one or more devices on the service provider network and may act as an interface between various processes in the service clients' data centers and the remote data store. The APIs to the block storage service may provide a standard interface to volume-based block storage operations to be performed on the remote data store. The service provider, the service clients, and/or third parties may develop and provide various applications and/or appliances that may, for example, be instantiated in service clients' local networks and that leverage the block storage service via the APIs to create and manage volumes and snapshots on the remote data store provided by the service provider and to upload and download data from the volumes and snapshots on the remote data store.

Embodiments of the block storage service and APIs may, for example, enable entities such as third party storage device providers to develop cloud technology-backed block devices, for example Storage Area Network (SAN) storage devices and Network-Attached Storage (NAS) devices, that upload data to and download data from "cloud" storage provided by the service provider. The block storage service and APIs also standardize the interface to the block-based cloud storage, which may enable the exchange of data with various storage technologies provided by the service provider and other storage device providers, and which may, for example, promote interoperability among backup and disaster recovery scenarios.

FIG. 1 is a high-level block diagram of an example network environment in which embodiments of a block storage service and APIs to the block storage service may be implemented. A service provider 110 coupled to an intermediate network 100 (e.g., the Internet) may provide remote, volume-based block storage (data store 114) to one or more service client networks (e.g., client networks 150A, 150B, and 150C), also coupled to intermediate network 100. Each client network 150 may correspond to a different service client, or two or more client networks 150 may correspond to different data centers or localities of the same service client, for example different regional offices of a business enterprise or different campuses of a school system. A service client may be a business enterprise, an educational entity, a government entity, a private entity, or in general any entity that implements a computer network or networks, coupled to an intermediate network 100 such as the Internet, to provide networked computing services to one or more users. Each client network 150 may include one or more client processes. A client process may be a physical and/or virtual machine or system connected to a local network of a service client.

As an example of remote data storage functions that may be provided by service provider 110, block-level storage volumes may be created in data store 114, and snapshots of volumes in data store 114 or, alternatively, snapshots of volumes in local storage on the service client's network 150, may be created. A snapshot may be viewed as an immutable, point-in-time capture of a volume. The ability to create volumes in data store 114 for a service client may allow, for example, the data store 114 to be used as a primary data store for the service client's data. The ability to take snapshots of volumes in a service client's local storage on a network 150 may allow, for example, the data store 114 to be used as backup or shadowing storage for the service client's primary data store on the service client's local storage. Note that, in both cases, service client data may be sent from a client network 150 to the service provider 110 network for storing in the data store 114, and service client data may also be retrieved from the remote data store 114 and returned to a client network 150.

The service provider 110 may store the service clients' data in the data store 114 according to block storage technology. In at least some embodiments, 4 MB (four megabyte) blocks may be used in the data store 114, but other sizes of blocks (e.g., 1 MB) may instead be used. The data store 114 may be implemented on or across several or many storage devices or systems on the service provider 110 network. A service client's volume data 116 and/or snapshot data 118 may be spread across two or more of the physical storage devices or systems. The storage devices may be, but are not necessarily, multi-tenant devices that are shared with other service clients. However, from the perspective of the users and processes on a client network 150, the respective service client's data may be presented as virtual volumes or files. Note that the data of other service clients that are also stored on the data store 114 are generally not visible to or accessible by the users and processes of the service client.

In at least some embodiments, manifests 120 may be used to track the volume data 116 and snapshot data 118 of the service clients on the data store 114. When a volume is created on data store 114, a manifest 120 for the volume is created. A volume manifest 120 may include volume information such as a service client identifier (e.g., an account identifier (ID)), a volume identifier (volume ID) unique to this volume, timestamps, and so on. A volume manifest 120 also includes entries that map chunks of volume data to locations in the data store 114. Each entry in the manifest 120 may also include a field that indicates the creator/owner of the respective chunk, which will typically but not always be an account identifier of the service client that owns this volume. In at least some embodiments, when a block of data for a given volume 116 is received, for example from a client network 150 of a service client corresponding to the volume, one or more chunks of the block may be stored to one or more locations in the data store 114. For each of these one or more locations, an entry is made in the volume manifest 120 that maps the respective chunk to the storage location. For example, a volume block of 4 MB may be received. If the block size of the data store is 1 MB, the volume block may be broken up into 1 MB chunks. Each chunk from the block may then be stored to a different location in the data store 114 (the locations may or may not be contiguous). For each chunk, an entry is made in the volume manifest 120 that maps the respective chunk to the storage location in data store 114.

Volumes and their corresponding volume manifests 120 are mutable. However, snapshots and their corresponding snapshot manifests 120 are immutable. A snapshot may be viewed as an immutable, point-in-time capture of a volume. The volume may be one of the volumes on data store 114 or, alternatively, a volume on a service client's local storage on a client network 150. When a snapshot of a volume is taken, a snapshot manifest 120 is created. A snapshot may thus be viewed as encompassing both the snapshot data 118 on the data store 114 and a snapshot manifest 120 that records the locations of the snapshot data 118 within the data store 114. The snapshot manifest 120 is essentially a representation of a given volume at the point in time that the snapshot of the volume was taken. A snapshot manifest 120 may include snapshot information, for example a snapshot identifier (ID) unique to this snapshot, information about the volume for which the snapshot was taken, an identifier for the service client that corresponds to the snapshot (e.g., an account ID), timestamps, and so on. A snapshot manifest 120 also includes entries that map chunks of the respective volume to object locations (the snapshot data 118) in the data store 114. Each entry may also include a field that indicates the creator/owner of the respective chunk. Volume manifests and snapshot manifests may thus be similar; however, while volume manifests are mutable, snapshot manifests are immutable.

In at least some embodiments, when a point-in-time snapshot of a volume on data store 114 is taken, the snapshot data 118 is not copied to another location but is instead made immutable within the volume. Alternatively, when or after a point-in-time snapshot of a volume is taken, the snapshot data 118 may be copied from the volume to new locations in the data store 114. When taking a snapshot of a volume on a client network 150, point-in-time data may be uploaded from the volume on the client network 150 to the data store 114.

A snapshot may, for example, be used as a basis to create a new volume or to restore a volume. For example, a new volume may be created on data store 114 from a snapshot, using the snapshot manifest 120 to locate the data for the new volume. As another example, a volume may be created or restored/recovered on a client network 150 from a snapshot on data store 114 according to the snapshot manifest 120.

In at least some embodiments, service provider 110 may also provide hardware virtualization 130 technology that enables the creation of "virtual" machine image instances 132 for service clients on hardware provided by the service provider 110. This hardware may be, but is not necessarily, multi-tenant hardware. That is, a service client's machine images may be instantiated on multi-tenant devices that are shared with other service clients. For a given service client, one or more machine image instances 132 may be attached to volumes on data store 114 and/or instantiated or "booted" from volumes (which may be referred to as boot images) maintained by the storage service 110 on data store 114. After a machine image instance 132 is originally attached to or booted from a volume on data store 114, the machine image instance 132 may be modified. These modifications may be reflected in the corresponding volume on data store 114. The service provider 110 may periodically or aperiodically create a differential snapshot of a machine image instance 132, for example at the service client's request, by taking a point-in-time snapshot of the corresponding volume on data store 114. Note that an initial snapshot may be created for a machine image instance 132 when the instance is created, with a new, differential snapshot created periodically or aperiodically thereafter. In turn, a machine image instance 132 may be created or recovered from a snapshot, for example by creating a volume on data store 114 from the snapshot and attaching a machine image instance 132 to the volume or booting a machine image instance 132 from the volume. For example, if a machine image instance 132 needs to be recovered or copied, a point-in-time version of the machine image may be obtained from a differential snapshot of the volume corresponding to the machine image instance 132.

Storage Gateway Appliance Technology

To provide an interface to the remote data store 114 for service customers, the service provider 110 may provide storage gateway appliance technology in which a storage gateway appliance on a client network 110 acts as a data target (e.g., iSCSI target) for processes on the client network. From the perspective of the processes, the storage gateway appliance appears as a data target on the local network. In at least some embodiments, the storage gateway appliance internally implements functionality to communicate, via secure proxy connections managed by a gateway control plane, with an interface to the data store 114 on the service provider 110 network to provide the block-based volume and snapshot functionality described above. The client (e.g., a network administrator) indirectly configures and manages operations of the storage gateway appliance via a console process on the service provider 110 network.

Figure 2:
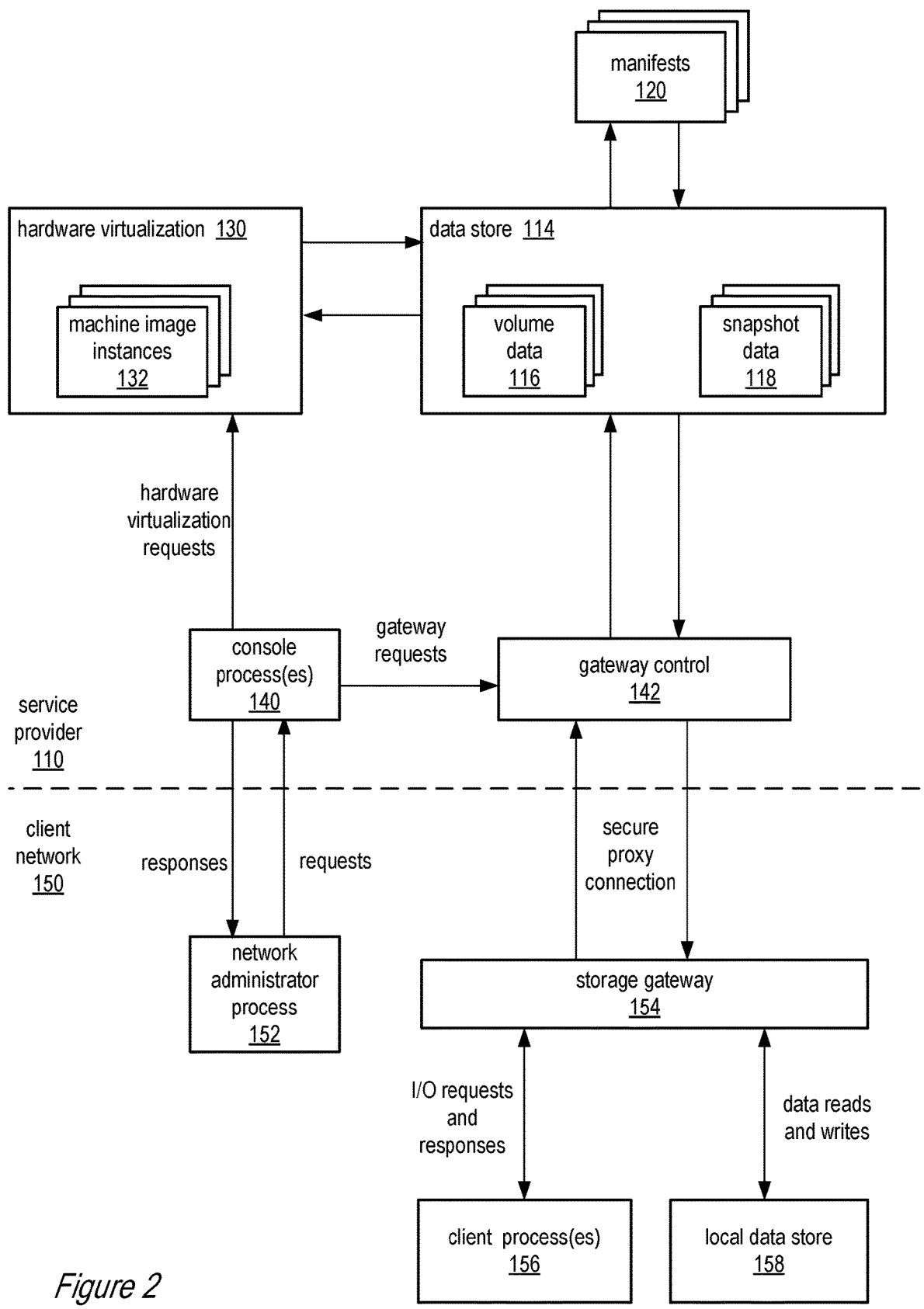
FIG. 2 is a block diagram that illustrates a storage gateway appliance on a client network that acts as a local interface to a remote data store on a service provider network, according to at least some embodiments.

FIG. 2 is a block diagram that illustrates a storage gateway appliance on a client network 110 that acts as a local interface to a remote data store 114 on a service provider 110 network, according to at least some embodiments. Embodiments of a storage gateway 154 that may be implemented as a virtual or physical appliance that is installed on-premise on a client network 150 to act as a gateway between the client network 150 and the data store 114 provided by the service provider 110 are described in U.S. patent application Ser. No. 13/174,505, titled "SHADOWING STORAGE GATEWAY," which is hereby incorporated by reference in its entirety, U.S. patent application Ser. No. 13/174,140, titled "METHODS AND APPARATUS FOR BLOCK STORAGE I/O OPERATIONS IN A STORAGE GATEWAY," which is hereby incorporated by reference in its entirety, U.S. patent application Ser. No. 13/174,489, titled "STORAGE GATEWAY SECURITY MODEL," which is hereby incorporated by reference in its entirety, U.S. patent application Ser. No. 13/174,524, titled "REMOTE STORAGE GATEWAY MANAGEMENT USING GATEWAY-INITIATED CONNECTIONS," which is hereby incorporated by reference in its entirety, and in U.S. patent application Ser. No. 13/324,907, titled "METHODS AND APPARATUS FOR CONTROLLING SNAPSHOT EXPORTS," which is hereby incorporated by reference in its entirety.

A storage gateway 154 on a service client's network may be configured as a cached gateway that provides an interface to and local cache for primary storage on data store 114 provided remotely by the service provider 110 and/or as a shadowing gateway that shadows primary storage implemented on a local data store 158 to remote storage on data store 114 provided by the service provider 110. The storage gateway 154 may present standard data access interfaces to the customer's applications at the front-end of the gateway appliance, convert the data accesses into storage service requests at the back-end of the gateway appliance, and transfer the data over an intermediate network to the service provider 110 network according to a storage service interface. The data access interfaces exposed by the storage gateway 154 to processes 156 on the client network 150 may include block storage protocols (e.g., iSCSI, GNBD (Global Network Block Device), etc.), file storage protocols (e.g., NFS (Network File Storage), CIFS (Common Internet File System), etc.), and/or object storage protocols (e.g., REST (Representational State Transfer)).

In an example embodiment, a cached gateway 154 may be though of as an on-premise block-based appliance that leverages on-premise (local) storage 158 for most frequent accessed data and remote storage 114 provided by the service provider 110 for essentially infinite total capacity. A cached gateway 154 may appear as a data interface target (e.g., an iSCSI target) operating within the client network 150, for example the cached gateway 154 may appear on the client network 150 as a storage array. The cached gateway 154 may, for example, expose logical unit numbers (LUNs), e.g., block-based storage devices such as hard disks, to processes 156 executing on devices within the client network 150. The processes 156 in turn may initiate data sessions (e.g., SCSI sessions) with LUNs and send data commands (e.g., SCSI commands) to the cached gateway 154.

In an example embodiment, a shadowing gateway 154 acts as a "bump in the wire" between a client's applications and the client's local data store 158 to provide shadowing of the client's write data (e.g., iSCSI writes) to remote storage 114 provided by the storage service 110. The local data store 158 serves as the primary data store for the client process(es) 156 on client network 150, in contrast to a cached gateway implementation where remote data store 114 serves as the primary data store. The shadowing gateway 154 exposes one or more data ports (e.g., iSCSI ports) to the client process(es) 156 on the client network 110. The client process(es) 156 on client network 150 may then read from and write to the local data store 158 via the storage gateway 154 data port(s). A client process 156 may be any hardware, software, and/or combination thereof that exists on the client network 150 and that can connect to and communicate with the storage gateway 154 via the data protocol of the gateway's data ports (e.g., the iSCSI protocol). Read requests from the client processes 156 may be passed directly to the local data store 158 without further interference or processing by shadowing gateway 154, and the requested data may be passed directly from local data store 158 to the client processes 156. Write requests directed to the local data store 158 are also passed to the local data store 158 by shadowing gateway 154. However, in addition to passing the write requests to the local data store 158, the storage gateway 154 may shadow the new or updated data indicated by the write requests to the remote data store 115.

Embodiments of the storage gateway 154 may be implemented according to a security model that provides data protection for the service client as well as protection against misuse and unauthorized use (e.g., pirating) of the storage gateway 154 by the service client or by third parties. The security model may include an activation process initiated by the gateway 154 to register with the service provider 110 and associate the gateway 154 with a client account; the gateway 154 is provided with security credentials that are used in subsequent communications with the service provider 110 network. The security model may also include establishing secure connections to external processes, for example processes of the service provider 110 via proxies provided by a gateway control plane 142 on the service provider 110 network. The gateway 154 initiates connections; the external processes do not initiate connections. The security model may also include the service client managing the gateway 154 through the service provider 110 via a console process 140 at the service provider 110 network. For example, a network administrator, via a network administrator process 152 on client network 150, may communicate with a console process 140 to view volumes and snapshots, create volumes, take snapshots, and create volumes from snapshots. In addition, a network administrator, via a network administrator process 152 on client network 150, may communicate with a console process 140 to manage the service client's machine image instances 132 provided by hardware virtualization 130 technology on service provider 110 network.

Block Storage Service and APIs to the Block Storage Service

While the storage gateway appliance technology described above enables the clients of the service provider 110 to utilize the remote, volume-based block storage provided on the remote data store 114, the technology limits the clients to the functionality that is provided by the storage gateway 154 appliance. In the client network 150, the storage gateway 154 appears as a data target (e.g., an iSCSI target) to the client processes 156. On the backend, the storage gateway 154 interfaces with the data store 114 via a secure proxy connection provided by gateway control 142. The service client (e.g., a network administrator) indirectly configures and manages the storage gateway appliance via a console process 140 on the service provider 110 network. However, this configuration and management is limited to the functionality that is provided by the storage gateway 154 appliance.

Embodiments of a block storage service and application programming interfaces (APIs) to the block storage service are described that allow the service provider, the service clients, and/or third parties to develop and provide various applications and/or appliances that may, for example, be instantiated in service clients' local networks and that leverage the block storage service via the APIs to create and manage volumes on the remote data store provided by the service provider. Embodiments of the block storage service and APIs may, for example, enable various entities such as third party storage device providers to develop cloud technology-backed block devices, for example Storage Area Network (SAN) storage devices and Network-Attached Storage (NAS) devices, that upload data to and download data from "cloud" storage provided by the service provider. The block storage service and APIs also standardize the interface to the block-based cloud storage, which may enable the exchange of data with various storage technologies provided by the service provider and other storage device providers, and which may, for example, promote interoperability among backup and disaster recovery scenarios.

The block storage service and APIs may be implemented on one or more devices on the service provider network, for example on one or more devices in a data plane of the service provider network, and may act as an interface between various processes in the service clients' data centers (or elsewhere in the networking environment) and the remote data store. The APIs to the block storage service may provide a standard interface to volume-based block storage operations on the remote data store that may be leveraged to develop various and diverse applications and/or appliances that may, for example, be instantiated in service clients' local networks and that leverage the block storage service via the APIs to create and manage volumes and snapshots of volumes on the remote data store provided by the service provider. The block storage service and APIs thus allow the service clients to utilize the remote, volume-based block storage provided on the remote data store in various ways without relying on the storage gateway appliance technology solution. The standard interface provided by the APIs may also enable the sharing of data among various applications or appliances that support the APIs, which may, for example, enable the exchange of data through the remote data store for backup or disaster recovery purposes, or for data exchange purposes.

Figure 3:
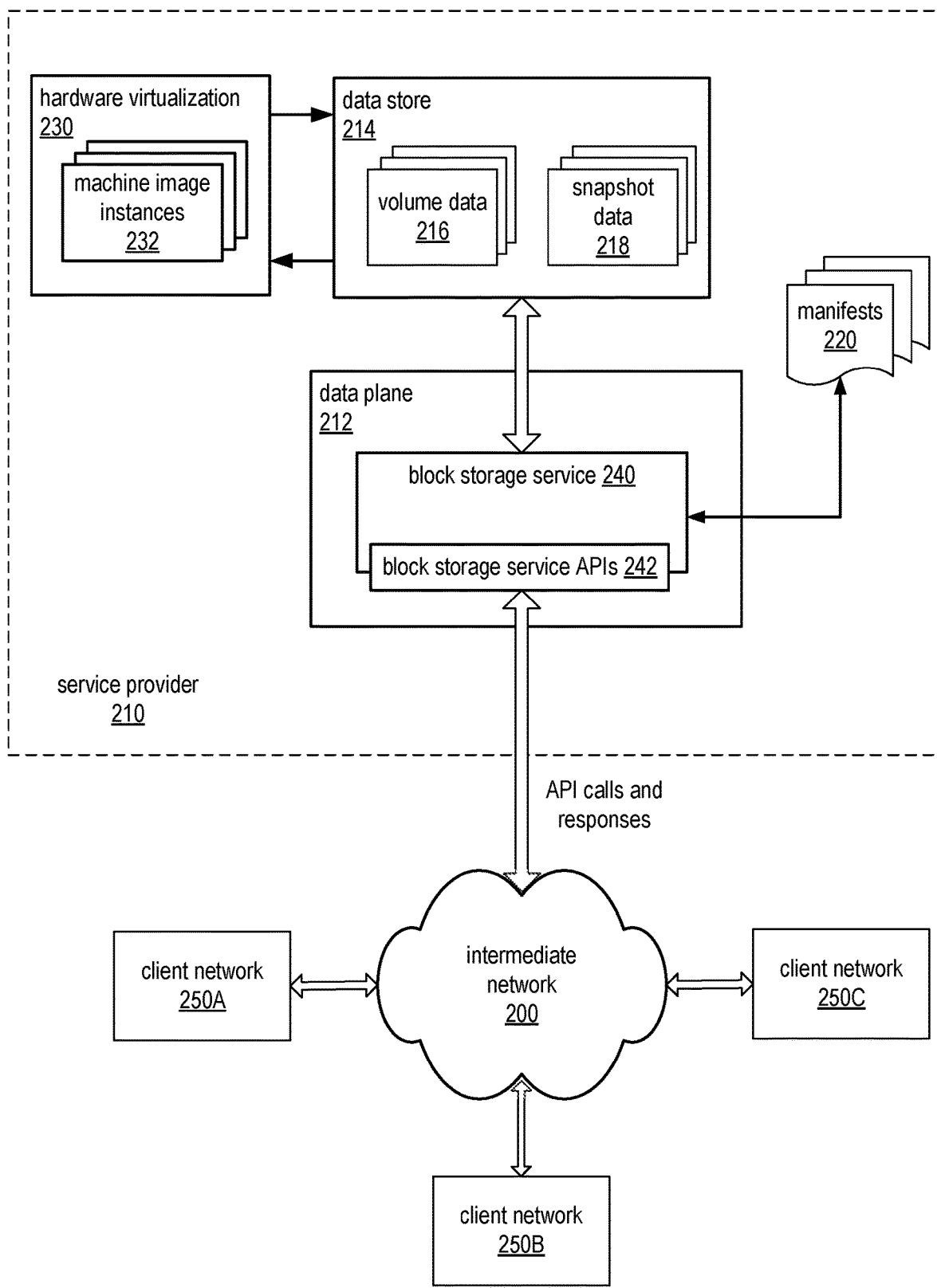
FIG. 3 is a high-level block diagram of an example network environment in which embodiments of a block storage service and APIs to the block storage service are implemented to provide a standard interface to a remote data store on a service provider network, according to at least some embodiments.

FIG. 3 is a high-level block diagram of an example network environment in which embodiments of a block storage service and APIs to the block storage service are implemented to provide a standard interface to a remote data store on a service provider network, according to at least some embodiments. A service provider 210 coupled to an intermediate network 200 (e.g., the Internet) may provide one or more service client networks (e.g., client networks 250A, 250B, and 250C), also coupled to intermediate network 200, access to a data store 214 via APIs 242 to a block storage service 240. The block storage service 240 may, for example, be implemented on a data plane 212 comprising one or more network devices. However, note that in some embodiments a portion or all of the block storage service 240 may be implemented elsewhere on the service provider 210 network, for example in a control plane. In at least some embodiments, the block storage service 240 may be implemented as a Web service, with the APIs 242 providing the Web service interface.

As examples of remote data storage functions that may be provided to the service clients via the APIs 242 to the block storage service 240, a service client may create block-level storage volumes in data store 214, and may take snapshots of volumes in data store 214 or, alternatively, snapshots of volumes in local storage on the service client's network 250. The APIs 242 may also allow a service client to create volumes either on data store 214 or on local storage in the service client's local network 250 from snapshots on data store 214. In addition, the APIs 242 may allow the service client to upload blocks of data from a client network 250 for storing in the remote data store 214, and to download blocks of data from the remote data store 214 to the client network 250. Other functions that may be provided through the APIs 242 may include, but are not limited to, deleting volumes, deleting snapshots, and reporting on the status of a snapshot in progress.

The block storage service 240 may store the service clients' data in the data store 214 according to block storage technology. In at least some embodiments, 4 MB (four megabyte) blocks may be used in the data store 214, but other sizes of blocks (e.g., 1 MB) may instead be used. The data store 214 may be implemented on or across several or many storage devices or systems on the service provider 210 network. A service client's volume data 216 and/or snapshot data 218 may be spread across two or more of the physical storage devices or systems. The storage devices may be, but are not necessarily, multi-tenant devices that are shared with other service clients. However, from the perspective of the users and processes on a client network 250, the respective service client's data may be presented as virtual volumes or files. Note that the data of other service clients that are also stored on the data store 214 are generally not visible to or accessible by the users and processes of the service client.

In at least some embodiments, manifests 220 may be used by the block storage service 240 to track the volume data 216 and snapshot data 218 of the service clients on the data store 214. When a volume is created on data store 214 via APIs 242, a manifest 220 for the volume is created. A volume manifest 220 may include volume information such as a service client identifier (e.g., an account identifier (ID)), a volume identifier (volume ID) unique to this volume, timestamps, and so on. A volume manifest 220 also includes entries that map chunks of volume data to locations in the data store 214. Each entry in the manifest 220 may also include a field that indicates the creator/owner of the respective chunk, which will typically but not always be an account identifier of the service client that owns this volume. In at least some embodiments, when a block of data for a given volume 216 is received via the APIs 242, for example from a client network 250 of a service client that owns the volume, one or more chunks of the block may be stored to one or more locations in the data store 214. For each of these one or more locations, an entry is made in the volume manifest 220 that maps the respective chunk to the storage location. For example, a volume block of 4 MB may be received via APIs 242. If the block size of the data store is 1 MB, the volume block may be broken up into 1 MB chunks. Each chunk from the block may then be stored to a different location in the data store 214 (the locations may or may not be contiguous). For each chunk, an entry is made in the volume manifest 220 that maps the respective chunk to the storage location in data store 214.

Volumes and their corresponding manifests 220 are mutable. However, snapshots and their corresponding snapshot manifests 220 are immutable. A snapshot may be viewed as an immutable, point-in-time capture of a volume. The volume may be one of the volumes on data store 214 or, alternatively, a volume on a service client's local storage on a client network 250. When a snapshot of a volume is created via the APIs 242, a snapshot manifest 220 is created. A snapshot may thus be viewed as encompassing both the snapshot data 218 on the data store 214 and a snapshot manifest 220 that records the locations of the snapshot data 218 within the data store 214. The snapshot manifest 220 is essentially a representation of a given volume at the point in time that the snapshot of the volume was taken. A snapshot manifest 220 may include snapshot information, for example a snapshot identifier (ID) unique to this snapshot, information about the volume for which the snapshot was taken, an identifier for the service client that created the snapshot (e.g., an account ID), timestamps, and so on. A snapshot manifest 220 also includes entries that map chunks of the respective volume to object locations (the snapshot data 218) in the data store 214. Each entry may also include a field that indicates the creator/owner of the respective chunk. Volume manifests and snapshot manifests may thus be similar; however, while volume manifests are mutable, snapshot manifests are immutable.

In at least some embodiments, when a point-in-time snapshot of a volume on data store 214 is created via the APIs 242, the snapshot data 218 is not copied to another location but is instead made immutable within the volume. Alternatively, when or after a point-in-time snapshot of a volume is created via the APIs 242, the snapshot data 218 may be copied from the volume to new locations in the data store 214. When creating a snapshot of a volume on a client network 250 via the APIs 242, point-in-time data may be uploaded from the volume on the client network 250 to the data store 214 via the APIs 242.

A snapshot may, for example, be specified via the APIs 242 to be used as a basis to create a new volume or to restore a volume. For example, a new volume may be created on data store 214 from a snapshot via the APIs 242, using the snapshot manifest 220 to locate the data for the new volume. As another example, a volume may be created or restored/ recovered on a client network 250 from a snapshot on data store 214 via the APIs 242 and according to the snapshot manifest 220.

In at least some embodiments, service provider 210 may also provide hardware virtualization 230 technology that enables service clients to create "virtual" machine image instances 232 on hardware provided by the service provider 210. For a given service client, one or more machine image instances 232 may be attached to volumes on data store 214 and/or instantiated or "booted" from volumes (which may be referred to as boot images) maintained by the storage service 210 on data store 214. After a machine image instance 232 is originally attached to or booted from a volume on data store 214, the machine image instance 232 may be modified. These modifications may be reflected in the corresponding volume on data store 214. A service client may request, via the APIs 242, that a differential snapshot of a machine image instance 232 be taken. The snapshot may then be created by taking a point-in-time snapshot of the corresponding volume on data store 214. In turn, a machine image instance 232 may be created or recovered from a snapshot, for example by requesting, via the APIs 242, the creation of a volume on data store 214 from the snapshot and attaching a machine image instance 232 to the volume or booting a machine image instance 232 from the volume.

Figure 4:
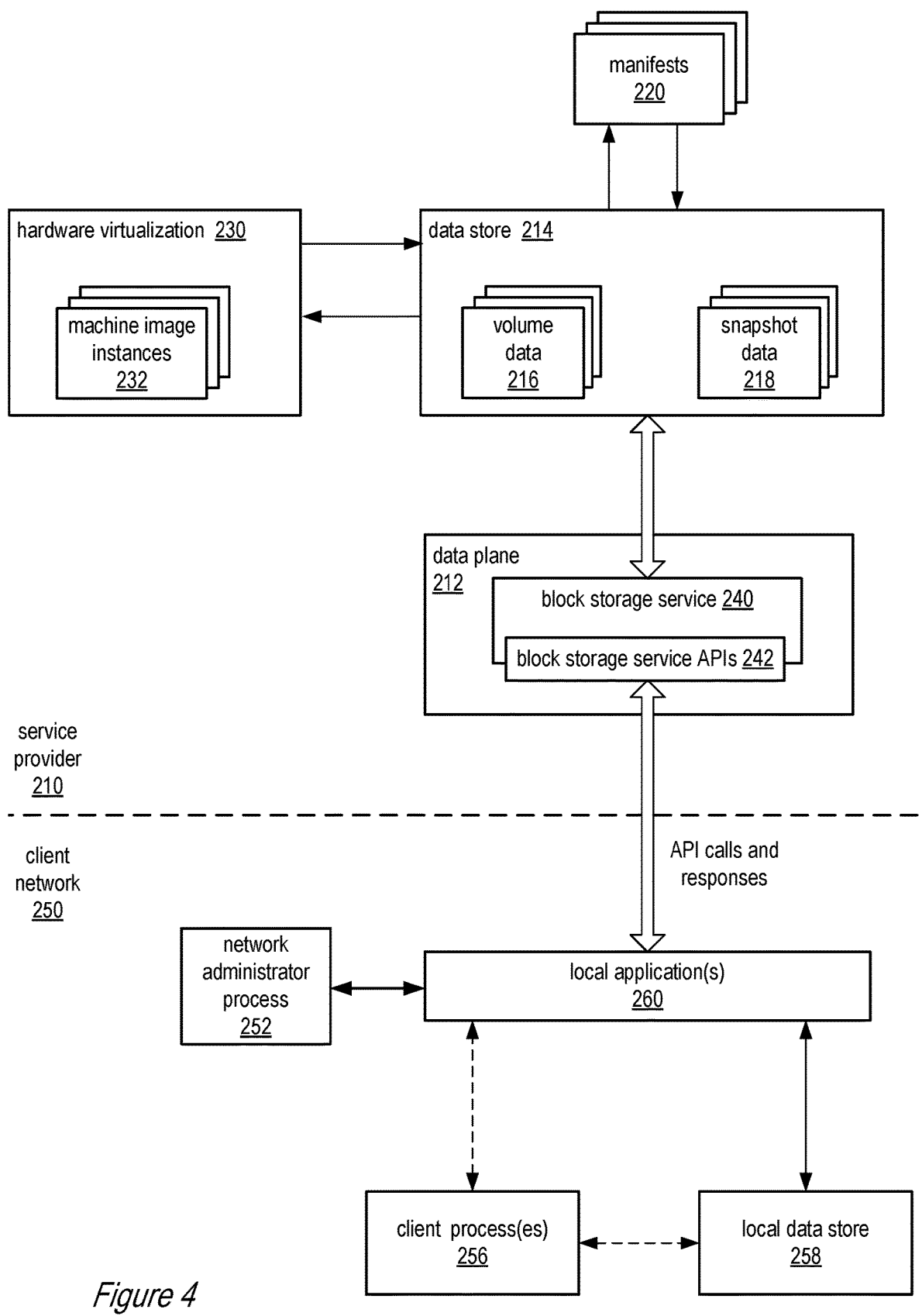
FIG. 4 is a block diagram that illustrates a client network including one or more local application(s) that leverage a block storage service and APIs to the service on a service provider network to perform volume-based block storage functions on a remote data store on the service provider network, according to at least some embodiments.

FIG. 4 is a block diagram that illustrates a client network 250 including one or more local application(s) that leverage a block storage service 240 and APIs 242 to the service on a service provider 210 network to perform volume-based block storage functions on a remote data store 214 on the service provider 210 network, according to at least some embodiments. The block storage service 240 and APIs 242 may provide a standard interface to the remote data store 214 on the service provider 210 network. The APIs 242 to the service expose functionality of the volume-based block storage provided on remote data store 214 to service clients. The block storage service 240 may, for example, be implemented on a data plane 212 of the service provider 210 network comprising one or more network devices such as servers.

The service provider, a service client, and/or a third party may develop applications or appliances (e.g., local application(s) 260) that may, for example, execute on a client network 250 and that leverage the APIs 242 to take advantage of the volume-based block storage on remote data store 214. As examples of remote data storage functions that may be performed by the local application(s) 260 via the APIs 242 to the block storage service 240, a local application 260 may create block-level storage volumes in data store 214, and may take snapshots of volumes in data store 214 or, alternatively, snapshots of volumes in local storage (e.g., local data store 258) on the service client's network 250. A local application 260 may also create volumes either on data store 214 or on local storage in the service client's local network 250 from snapshots on data store 214 via the APIs 242. In addition, a local application 260 may upload blocks of data from a client network 250 for storing in the remote data store 214 via the APIs 242, and download blocks of data from the remote data store 214 to the client network 250 via the APIs 242. Other functions that may be performed by a local application 260 through the APIs 242 may include, but are not limited to, deleting volumes, deleting snapshots, and reporting on the status of a snapshot in progress. The local storage (e.g., local data store 258) on client network may be any type of storage system or storage device, and may serve as a data source or a data destination.

Note that the API calls and responses between local application(s) 260 and block storage service APIs 242 in FIG. 4 are not performed over a secure proxy connection managed by a gateway control plane as in the storage gateway system illustrated in FIG. 2. The communications between local application(s) 260 and block storage service APIs 242 may be performed over the public network or, alternatively, over a private channel such as a virtual private network (VPN) connection. Also note that the service client, for example via a network administrator process 252 on client network 250, may directly interface with a local application 260 to manage and control operations of the application 260, in contrast to the storage gateway system illustrated in FIG. 2 in which the storage gateway is managed and controlled via a console process on the service provider network.

A wide variety of applications 260 may be developed using the APIs 242. As an example, a service client or third party may develop a relatively simple application that creates a volume on remote data store 214 via a "create volume" API and copies a data set from a data source (e.g., a tape, a disk, a storage system, etc.) to the volume according to an "upload block" API. As a more complex example, a third party storage device provider may develop cloud technology-backed block devices, for example Storage Area Network (SAN) storage devices and Network-Attached Storage (NAS) devices, that upload data to and download data from "cloud" storage (remote data store 214) provided by the service provider 210 network via the APIs 242. As indicated by the dotted line from client process(es) 256 to local application(s) 260 in FIG. 4, client process(es) 256 may or may not interface with such a local application 260. As indicated by the dotted line from client process(es) 256 to local data store 258, client process(es) 256 may or may not access local data store 258 through other interfaces or methods instead of or in addition to via the local application(s) 260. Several use cases and other examples of applications 260 that may leverage the APIs 242 are described later in this document.

Example APIs to the Block Storage Service

This section describes an example set of functions for the remote, volume-based block storage that may be provided by the block storage service 240 and exposed to the service clients or other entities via the APIs 242 to the block storage service 240, according to at least some embodiments. The example set of functions described herein is not intended to be limiting. The APIs 242 may be implemented according to different technologies including but not limited to Simple Object Access Protocol (SOAP) technology and Representational state transfer (REST) technology. In other words, the APIs 242 may be, but are not necessarily, implemented as SOAP APIs or RESTful APIs. SOAP is a protocol for exchanging information in the context of web services. REST is an architecture for distributed hypermedia systems. A RESTful API (which may also be referred to as a RESTful web service) is a web service API implemented using HTTP and REST technology. The APIs 242 can be wrapped with client libraries in various languages including but not limited to C, C++, Java, C#, and Perl to support integration with the block storage service 240.

Several APIs 242 may be used to expose the functionality of the block storage service 240 to the service clients and/or third party vendors that may be leveraged to develop applications and/or appliances for use in the service clients' data centers, as an example. These functions may include, but are not limited to, a create volume function, a create snapshot function, an upload block function, a download block function, a snapshot progress function, a delete volume function, and a delete snapshot function. The following describes example APIs to each of these functions.

Create Volume API

A create volume API may be provided that allows a caller to request creation of an empty volume on data store 212. In at least some embodiments, the create volume API may also allow a caller to request creation or restoring of a volume on data store 212 (or alternatively on some other storage system, for example a local data store on the service client's network) from a specified snapshot of a volume on data store 212. The create volume API may also enable a caller to bootstrap a volume from existing data other than a snapshot, for example data on a service client's local data store. In at least some embodiments, in response to the create volume API call, the block storage service 240 creates the new volume and a volume manifest, and may also create an initial snapshot of the new volume and a snapshot manifest.

Figure 5:
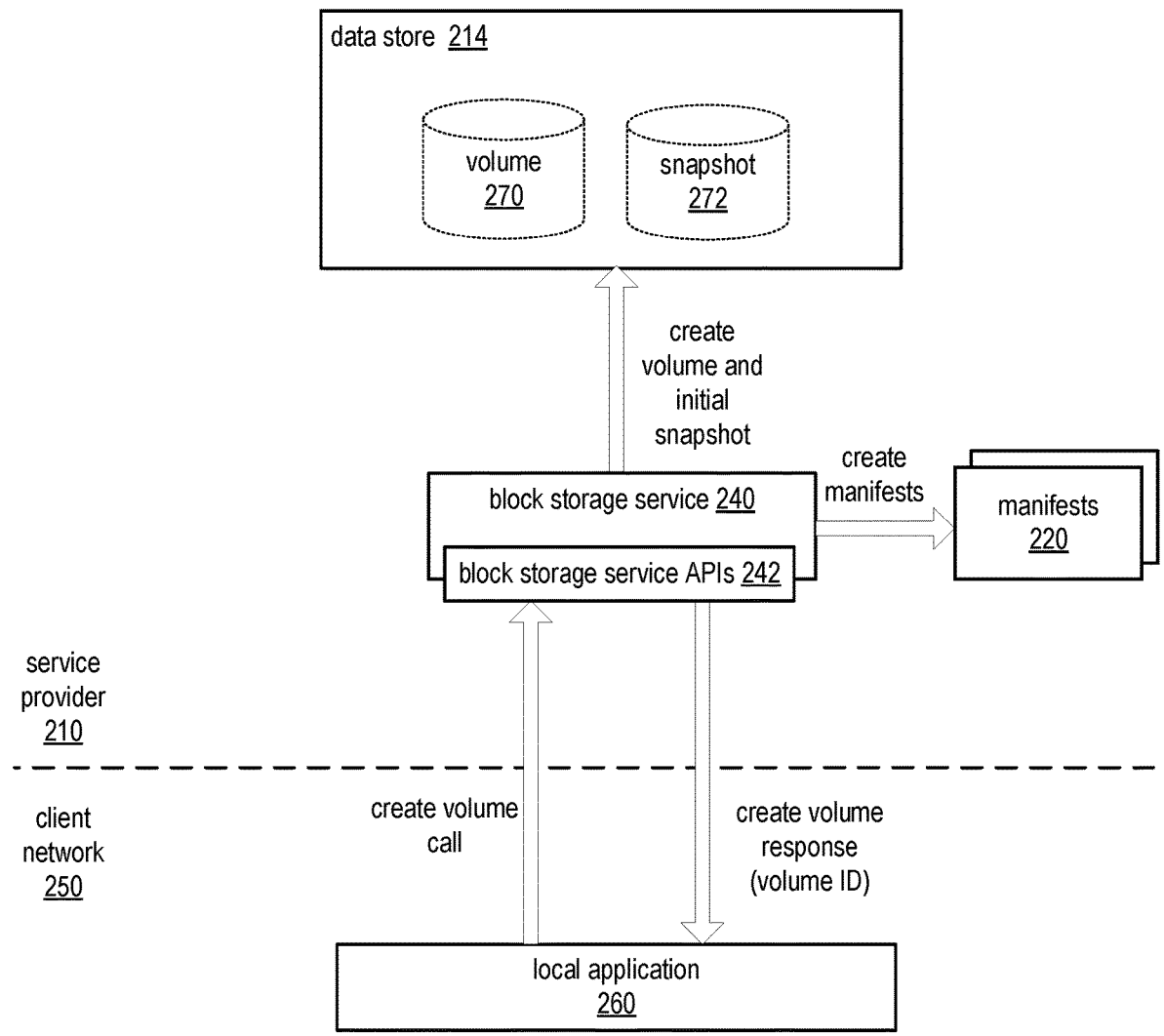
FIG. 5 is a high-level block diagram that illustrates creating a volume via the create volume API, according to at least some embodiments.

FIG. 5 is a high-level block diagram that illustrates creating a volume via the create volume API, according to at least some embodiments. A local application 260 on a client network may make a create volume call to the block storage service APIs 242 on service provider 210 network. The call may include several input parameters, as described below. The block storage service APIs 242 and/or block storage service 240 may check one or more parameters of the create volume call to determine if the call is valid. If the call is not valid for some reason, an indication of the problem may be returned to the local application 260. If the call is valid, then the block storage service 240 may create a new volume 270 on data store 214 according to the input parameters. In at least some embodiments, a manifest 220 for the volume 270 may be created. In at least some embodiments, an initial snapshot 272 of the volume, and corresponding snapshot manifest 220, may also be created. A response to the create volume call may be returned to the local application 260 according to the block storage service APIs 242 that indicates at least the volume identifier (volume ID) of the new volume 270. In at least some embodiments, the response may also indicate the snapshot identifier (snapshot ID) of the initial snapshot 272 if created.

In at least some embodiments, when the caller is using the create volume API to create a volume from a specified snapshot on data store 212, the caller specifies the snapshot in the create volume request. A copy of the snapshot manifest is made and is used as the volume manifest. The snapshot manifest is immutable; the volume manifest is mutable. The snapshot that the volume is created from may be a completed snapshot or an incomplete snapshot. If incomplete, additional data subsequently uploaded to the snapshot is included in the volume. In addition, new data (data created after the point-in-time of the snapshot) may be added to the volume, and dirty data (data modified after the point-in-time of the snapshot) may be written to the volume. After creating the volume from the snapshot using the create volume API, the user may begin downloading data from the volume as necessary or desired, and may take snapshots of the volume.

Create Volume API Input Parameters

In at least some embodiments, input parameters to the create volume API may include, but are not limited to, one or more authentication parameters, an optional volume size parameter, an optional snapshot identifier (snapshot ID), and an idempotency key.

The one or more authentication parameters may include a certificate, a private key, or some other data for authenticating the caller with the service provider. A certificate may, for example contain service client information information, for example an account ID of the service client with the service provider.

The optional volume size parameter allows the caller to specify a size for a volume to be created. If a volume size is not specified, the volume size to be used may be determined from another parameter (e.g., from the size of a specified snapshot, if a snapshot is specified), a default volume size may be used, or some other method for determining the volume size may be used.

The optional snapshot ID parameter may be used, for example, to specify a snapshot on the service provider data store from which the volume is to be created or restored. If a snapshot ID is not specified, then a new empty volume may be created.

The idempotency key may enable the create volume API to be retried without side effects. In other words, the create volume API call may be an idempotent operation that has no additional effect if it is called more than once with the same input parameters.

Create Volume API Output Parameters

In at least some embodiments, output parameters of the create volume API may include, but are not limited to, a volume identifier (volume ID) for the new volume, and a snapshot ID for an initial snapshot of the new volume. When a volume is created, an initial snapshot (which may include snapshot data and a snapshot manifest) of the volume is created. An identifier for this snapshot may be returned with the volume ID. In at least some embodiments, both the volume ID and the snapshot ID may be globally unique identifiers (GUIDs).

While a volume ID and snapshot ID are described as being returned to the caller, note that other methods for identifying volumes and snapshots to the caller may be used. Generally speaking, some type of handle to the volume and the snapshot are returned to the caller that the caller may then use in subsequent API calls to identify the volume and snapshot.

Create Volume API Exceptions

In at least some embodiments, indications of exceptions that may be returned to the caller by the create volume API may include an authentication failure exception, an invalid volume size exception, an invalid snapshot ID exception, and an invalid volume ID exception.

An authentication failure exception may be raised if the service provider cannot authenticate the caller according to the one or more input authentication parameters.

An invalid volume size exception may be raised if a snapshot was specified using the snapshot ID input parameter and the input volume size is less than the size of the specified snapshot. An invalid volume size exception may also be raised if the input volume size is less than a minimum volume size or greater than a maximum volume size. In other words, the block storage service 240 may limit volume size to within a range from a minimum size to a maximum size, and if the caller requests a volume size that is not within this range, then an invalid volume size exception may be raised.

An invalid snapshot ID exception may be raised if the caller specifies a snapshot with the snapshot ID input parameter, and if the block storage service 240 cannot locate the specified snapshot or determines that the snapshot ID is invalid for some other reason (e.g., the specified snapshot exists but does not belong to the service provider or the service provider is not allowed to export the snapshot to local storage).

Create Snapshot API

A create snapshot API may be provided that allows a caller to request creation of a snapshot of an existing volume on remote data store 212, or alternatively to request creation of a snapshot for an existing volume on a service client's local data store 258. After the snapshot is created, data may be uploaded to the snapshot, for example from a volume on a local data store 258. In at least some embodiments, multiple snapshots of a given volume may be created. In at least some embodiments, a versioning scheme may be used to distinguish between snapshots of a given volume. In at least some embodiments, a data version may be atomically incremented to insure data consistency. (E.g., version 1, version 2, etc.) In at least some embodiments, there may be multiple snapshots of a given volume that are in progress at a given time. In at least some embodiments, the multiple snapshots of a given volume are completed in the order that they were created. In at least some embodiments, data can only be uploaded to the earliest outstanding snapshot of a given volume. Note that a manifest for the snapshot may also be created.

Figure 6:
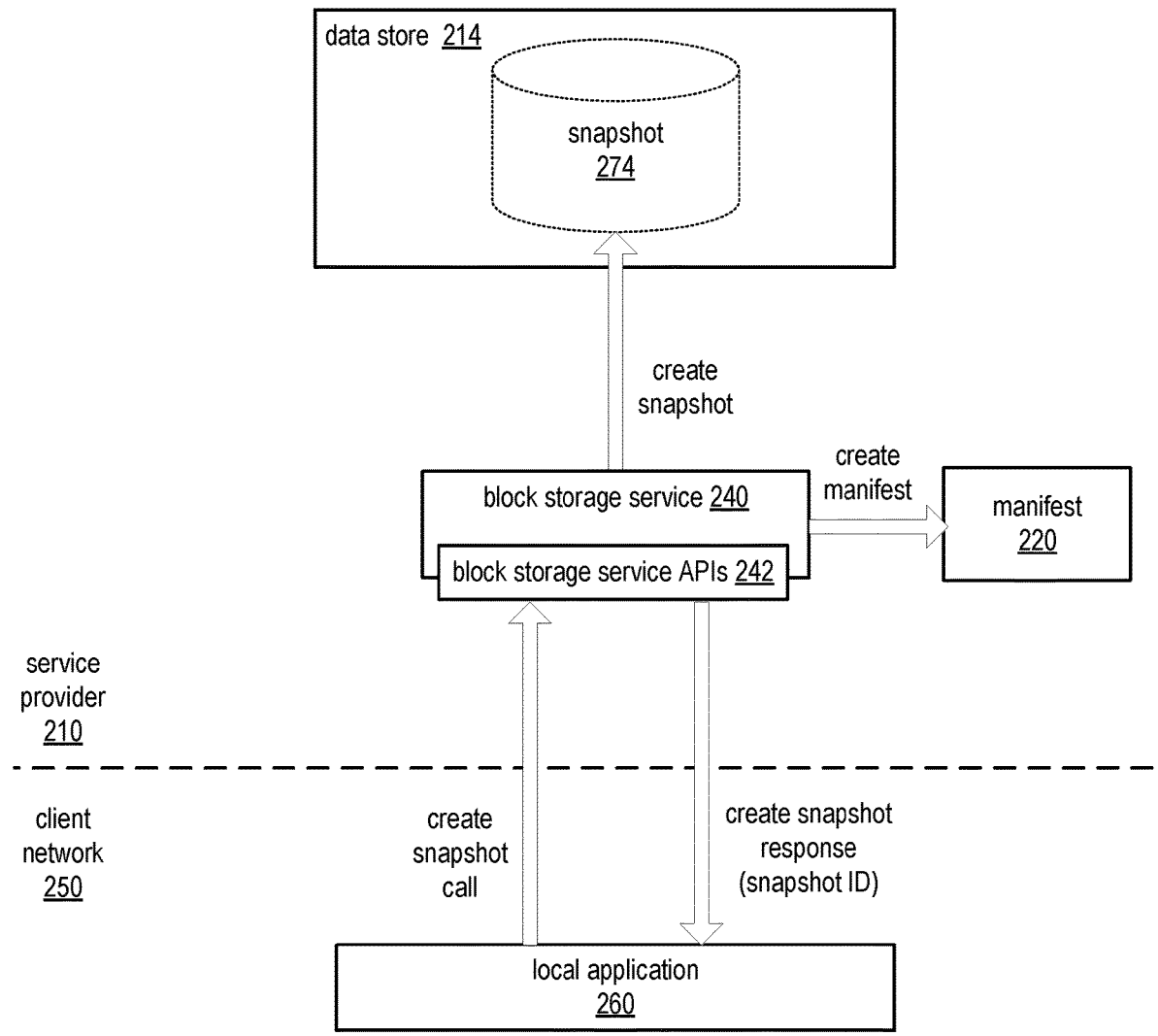
FIG. 6 is a high-level block diagram that illustrates creating a snapshot via the create snapshot API, according to at least some embodiments.

FIG. 6 is a high-level block diagram that illustrates creating a snapshot via the create snapshot API, according to at least some embodiments. A local application 260 on a client network may make a create snapshot call to the block storage service APIs 242 on service provider 210 network. The call may include several input parameters, as described below. The block storage service APIs 242 and/or block storage service 240 may check one or more parameters of the create snapshot call to determine if the call is valid. If the call is not valid for some reason, an indication of the problem may be returned to the local application 260. If the call is valid, then the block storage service 240 may create a new snapshot 274 on data store 214 for a specified volume according to the input parameters. In at least some embodiments, a manifest 220 for the snapshot 274 may be created.

A response to the create snapshot call may be returned to the local application 260 according to the block storage service APIs 242 that indicates at least the snapshot identifier (snapshot ID) of the snapshot 274.

Create Snapshot API Input Parameters

In at least some embodiments, input parameters to the create snapshot API may include, but are not limited to, one or more authentication parameters, a volume identifier (volume ID), a list of data chunk tokens, and an idempotency key.

The one or more authentication parameters may include a certificate, a private key, or some other data for authenticating the caller with the service provider. A certificate may, for example contain service client information information, for example an account ID of the service client with the service provider.

The volume ID parameter may be used to specify a volume on remote data store 212 or alternatively a volume on the service client's local data store 258 for which a snapshot is to be created.

The list of data chunk tokens may be either a pointer to or other locator for a list of tokens or an actual list of tokens that each uniquely identifies a unit of data (a chunk) in a volume, for example a volume on the service client's local data store 258, for which the snapshot is being taken. A data chunk token may, for example, be a hash of a unit of data (a chunk). In block-based data systems (for example, block storage systems), a unit of data (a chunk) may, for example, be a 256 k-byte portion of a data block, a 1024 k-byte portion of a data block, a 1-megabyte portion of a data block, some other fixed or variable sized portion of a data block, or may be the entire data block. In file-based systems, a unit of data may be a file, or a portion of a file similar to the portions in a block-based data system. The data chunk tokens may, for example, be used in a data deduplication technique that may be applied when uploading data blocks according to the upload block API to reduce the amount of data that is actually uploaded.

The idempotency key may enable the create snapshot API to be retried without side effects. In other words, the create snapshot API call may be an idempotent operation that has no additional effect if it is called more than once with the same input parameters.

Create Snapshot API Output Parameters

In at least some embodiments, output parameters of the create snapshot API may include, but are not limited to, a snapshot identifier (snapshot ID) for the initial snapshot of the specified volume. In at least some embodiments, the snapshot ID may be a globally unique identifier (GUID).

While a snapshot ID is described as being returned to the caller, note that other methods for identifying snapshots to the caller may be used. Generally speaking, some type of handle to the snapshot is returned to the caller that the caller may then use in subsequent API calls to identify the snapshot.

Create Snapshot API Exceptions

In at least some embodiments, indications of exceptions that may be returned to the caller by the create snapshot API may include an authentication failure exception, an invalid volume ID exception, and an invalid chunk token exception.

An authentication failure exception may be raised if the service provider cannot authenticate the caller according to the one or more input authentication parameters.

An invalid volume ID exception may be raised if the volume specified by the volume ID input parameter cannot be located or if the volume ID is determined to be invalid for some other reason (e.g., the specified volume does not belong to the service provider).

Upload Block API

An upload block API may be provided that allows a caller to upload blocks of data to a specified volume or snapshot on remote data store 212.

The upload block API may be used, for example, to upload data from a volume on local data store 258 to a specified snapshot on remote data store 214. In at least some embodiments, multiple snapshots of a given volume may be created. In at least some embodiments, a versioning scheme may be used to distinguish between snapshots of a given volume. In at least some embodiments, a data version may be atomically incremented to insure data consistency. (E.g., version 1, version 2, etc.) In at least some embodiments, there may be multiple snapshots of a given volume that are in progress at a given time. In at least some embodiments, the multiple snapshots of a given volume are completed in the order that they were created. In at least some embodiments, data can only be uploaded to the earliest outstanding snapshot of a given volume.

Figure 7:
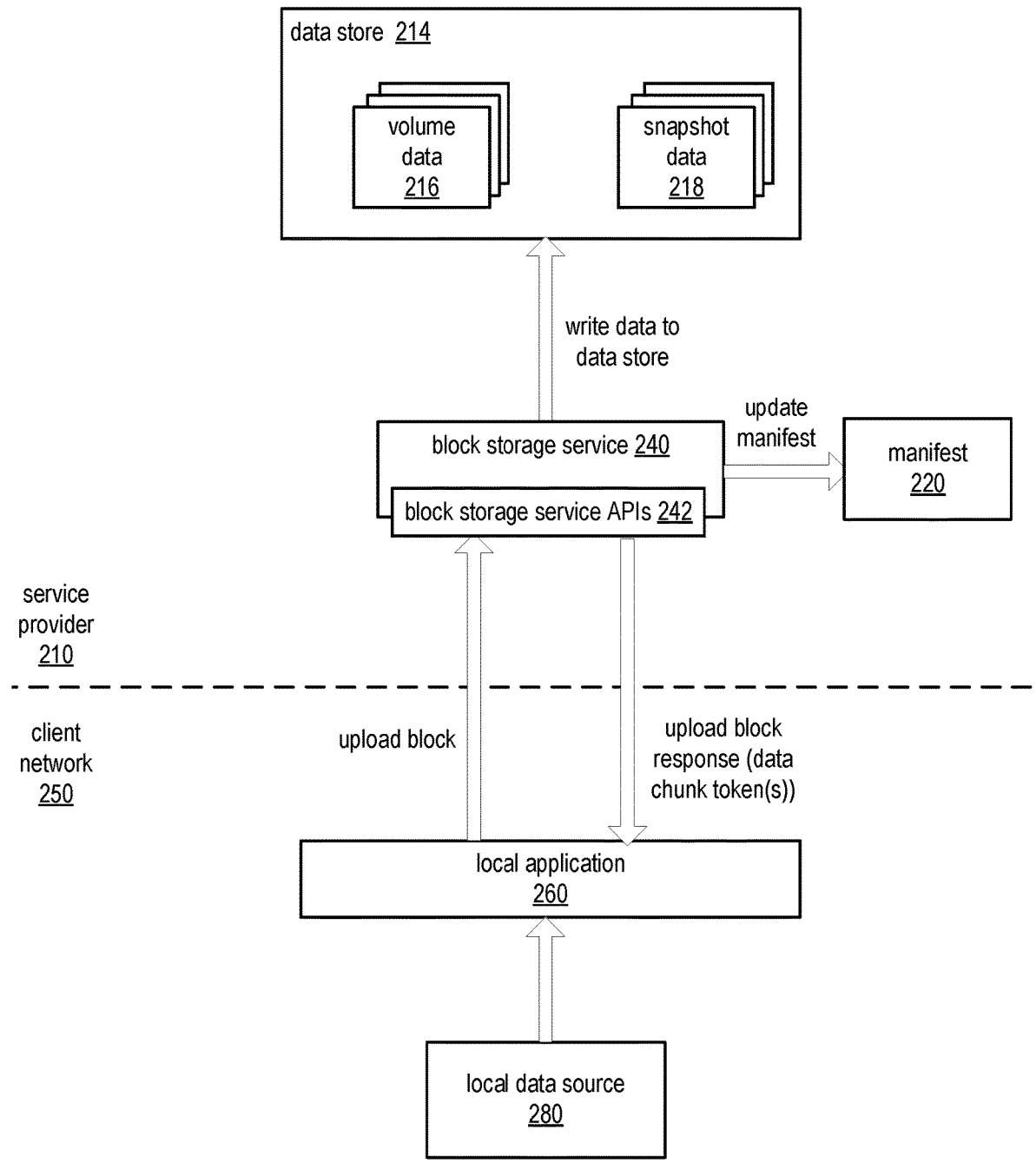
FIG. 7 is a high-level block diagram that illustrates uploading data to the remote data store according to the upload block API, according to at least some embodiments.

FIG. 7 is a high-level block diagram that illustrates uploading data to the remote data store according to the upload block API, according to at least some embodiments. A local application 260 on a client network may make an upload block call to the block storage service APIs 242 on service provider 210 network to upload data from a local data source 280 to the remote data store 214. The call may include several input parameters, as described below. The block storage service APIs 242 and/or block storage service 240 may check one or more parameters of the upload block call to determine if the call is valid. If the call is not valid for some reason, an indication of the problem may be returned to the local application 260. If the call is valid, then the block storage service 240 may write the data indicated by the upload block call to the data store 212 according to the upload block input parameters, and may update the corresponding manifest 220. A response to the upload call may be returned to the local application 260 according to the block storage service APIs 242 that may indicate one or more data chunk tokens that were generated for the uploaded data. A data chunk token may serve as an identifier for a unit of data that was uploaded.

Note that the uploaded data may either be volume data 216 or snapshot data 218 as indicated by the upload block input parameters. The local data source 280 may, for example, be a volume on a local data store on client network 250, a client process on client network 250, a tape, a file on a local data store, a cache, or any of various other sources for data.

Upload Block API Input Parameters

In at least some embodiments, input parameters to the upload block API may include, but are not limited to, one or more authentication parameters, a volume identifier (volume ID), a snapshot identifier (snapshot ID), a data version, a compressed parameter, and, for each of one or more data blocks being uploaded, a data offset, a data length, a checksum, and the data to be uploaded. In some embodiments, the input parameters for the upload block API may also include a snapshot progress parameter.

The one or more authentication parameters may include a certificate, a private key, or some other data for authenticating the caller with the service provider. A certificate may, for example contain service client information information, for example an account ID of the service client with the service provider.

The volume ID parameter may be used to specify a volume on remote data store 212 to which the data block is being uploaded.

The snapshot ID parameter may be used to specify a snapshot on remote data store 212 to which the data block is being uploaded. In some embodiments, the input parameters for the upload block API may also include a snapshot progress parameter that may be used to indicate the percentage of the snapshot that has been uploaded at this upload and to indicate if the snapshot is completed with this upload (i.e. by indicating 100%).

The data version parameter may be used to specify a snapshot version. The data version may be used, for example, in a versioning scheme to distinguish between multiple point-in-time snapshots of a given volume. In at least some embodiments, the data version parameter may, for example, be used to synchronize the version of the data on the local storage with the data on the remote data store 214. A server handling an upload block API request may refer to the data version parameter to prevent a newer block of data on remote data store 214 from being overwritten with an older block of data specified in the request.

The compressed parameter may be used to indicate if the data being uploaded is or is not compressed according to a compression scheme or techniques.

The data offset may be an offset into the specified volume or snapshot on the remote data store 214 at which the respective data is to be stored.

The data length may be a length (e.g., in bytes) of the respective data being uploaded.

The checksum may be an MD5, CRC32, SHA-256, or some other checksum of the respective data being uploaded.

Upload Block API Output Parameters

In at least some embodiments, output parameters of the upload block API may include, but are not limited to, one or more data chunk tokens. A data chunk token is an identifier for a unit of data that was uploaded. A data chunk token may, for example, be a hash of a unit of data. Both the block storage service 240 and the local application 260 may store data chunk tokens, and may use the tokens to identify data chunks in upload and/or download operations, for example in a data deduplication technique.

In some embodiments, data chunks may be uploaded for a snapshot proactively before a snapshot is created, and the data chunk tokens may be submitted and included in the snapshot manifest when the snapshot is created. The data chunk token is a unique identifier that allows the block storage service to locate the data chunk in the remote data store. Alternatively, a snapshot may be created before data chunks are uploaded to the snapshot; in this case, a snapshot token may be returned instead of the data chunk token. The snapshot token uniquely identifies the point of time version of the snapshot. The snapshot token may, for example, be used by multiple servers (e.g., load balanced servers) to access the same snapshot manifest.

Upload Block API Exceptions

In at least some embodiments, indications of exceptions that may be returned to the caller by the upload block API may include an authentication failure exception, an invalid volume ID exception, an invalid snapshot ID exception, an invalid data version exception, a checksum error exception, and a snapshot already complete exception.

An authentication failure exception may be raised if the service provider cannot authenticate the caller according to the one or more input authentication parameters.

An invalid volume ID exception may be raised if the volume specified by the volume ID input parameter cannot be located or if the volume ID is determined to be invalid for some other reason (e.g., the specified volume does not belong to the service provider).

An invalid snapshot ID exception may be raised if the caller specifies a snapshot with the snapshot ID input parameter, and if the block storage service 240 cannot locate the specified snapshot or determines that the snapshot ID is invalid for some other reason (e.g., the specified snapshot exists but does not belong to the service provider).

An invalid version exception may be raised, for example, if the caller specifies a version that does not exist, or if there is an earlier snapshot version that has not been completed and the caller specifies a later version.

A checksum error exception may be raised if an error in the data block being uploaded is detected according to the checksum provided as an input parameter.

A snapshot already complete exception may be raised if it is determined that the caller is attempting to upload a data block to a snapshot that is indicated as being complete. As previously noted, snapshots, once generated, are immutable. Note that the snapshot progress API may be used to indicate what percentage of a snapshot has been uploaded and to report when the snapshot is complete.

Download Block API

A download block API may be provided that allows a caller to download blocks of data from a specified volume or snapshot on remote data store 212. The download block API may, for example, be used by a local application 260 to download a latest (most recent or up-to-date) copy of data from a specified volume on remote data store 214. The downloaded data may, for example, be written to a local cache and/or to a local data store 258. As another example, the download block API may be used to download data from a specified snapshot on remote data store 214 to a volume being restored from the snapshot on a local data store 258.

Figure 8:
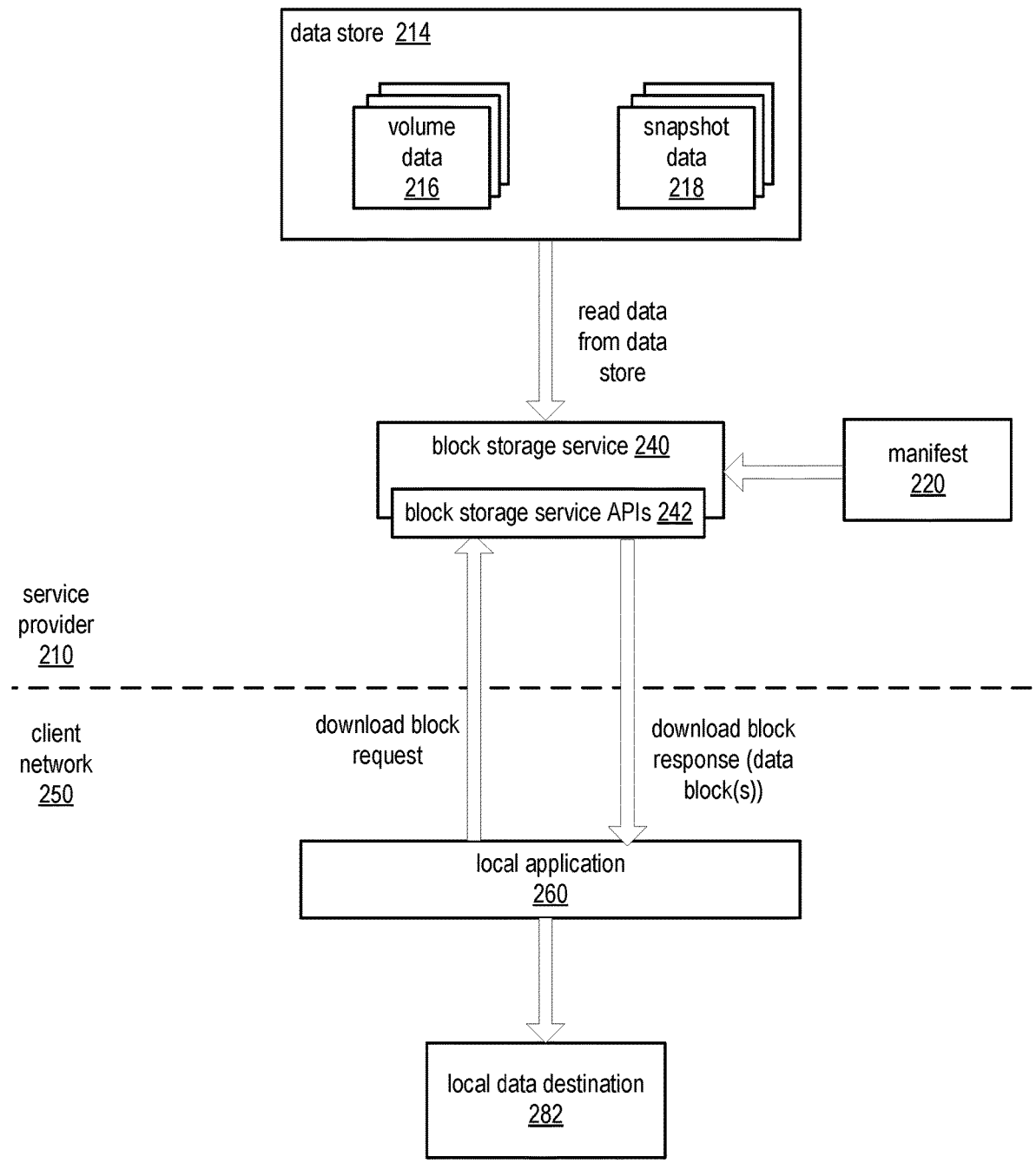
FIG. 8 is a high-level block diagram that illustrates downloading data from the remote data store according to the download block API, according to at least some embodiments.

FIG. 8 is a high-level block diagram that illustrates downloading data from the remote data store according to the download block API, according to at least some embodiments. A local application 260 on a client network may make a download block call to the block storage service APIs 242 on service provider 210 network to request download of specified data from the remote data store 214. The call may include several input parameters, as described below. The block storage service APIs 242 and/or block storage service 240 may check one or more parameters of the download block call to determine if the call is valid. If the call is not valid for some reason, an indication of the problem may be returned to the local application 260. If the call is valid, then the block storage service 240 may read the data indicated by the download block call from the data store 214 according to the download block input parameters. To locate the data, the block storage service 240 may access the corresponding manifest 220. A response to the download block call may be returned to the local application 260 according to the block storage service APIs 242 that may indicate a data offset, a data length, a checksum, and the data for each of one or more data blocks being downloaded.

Note that the downloaded data may either be volume data 216 or snapshot data 218 as indicated by the download block input parameters. The local application 260 may provide or write the downloaded data to a local data destination 282. The local data destination 282 may, for example, be a volume on a local data store on client network 250 that is being generated from a snapshot on remote data store 214, a client process on client network 250, a tape, a file on a local data store, a cache, or any of various other destinations for data.

Download Block API Input Parameters

In at least some embodiments, input parameters to the upload block API may include, but are not limited to, one or more authentication parameters, a volume identifier (volume ID), a snapshot identifier (snapshot ID), and, for each of one or more data blocks to be downloaded, a data offset, a data length, and a compressed parameter.

The one or more authentication parameters may include a certificate, a private key, or some other data for authenticating the caller with the service provider. A certificate may, for example contain service client information information, for example an account ID of the service client with the service provider.

The volume ID parameter may be used to specify a volume on remote data store 212 from which data is to be downloaded.

The snapshot ID parameter may be used to specify a snapshot on remote data store 212 from which data is to be downloaded. In at least some embodiments, a snapshot version may also be included as an input parameter.

The data offset may be an offset into the specified volume or snapshot on the remote data store 214 from which the data is to be downloaded.

The data length may be a length (e.g., in bytes) of the data to be downloaded from the volume at the data offset.

The compressed parameter may be used to indicate if the data being downloaded is or is not compressed according to a compression scheme.

Download Block API Output Parameters

In at least some embodiments, output parameters of the download block API may include, but are not limited to, for each of one or more data blocks being downloaded, a data offset, a data length, a checksum, and the data being downloaded.

The data offset may be an offset into the specified volume or snapshot on the remote data store 214 from which the respective data is being downloaded.

The data length may be a length (e.g., in bytes) of the respective data being downloaded.

The checksum may be an MD5, CRC32, SHA-256, or some other checksum of the respective data being downloaded.

Download Block API Exceptions

In at least some embodiments, indications of exceptions that may be returned to the caller by the download block API may include an authentication failure exception, an invalid volume ID exception, and an invalid snapshot ID exception.

An authentication failure exception may be raised if the service provider cannot authenticate the caller according to the one or more input authentication parameters.

An invalid volume ID exception may be raised if the volume specified by the volume ID input parameter cannot be located or if the volume ID is determined to be invalid for some other reason (e.g., the specified volume does not belong to the service provider).

An invalid snapshot ID exception may be raised if the caller specifies a snapshot with the snapshot ID input parameter, and if the block storage service 240 cannot locate the specified snapshot or determines that the snapshot ID is invalid for some other reason (e.g., the specified snapshot exists but does not belong to the service provider).

Snapshot Progress API

A snapshot progress API may be provided that, for example, allows a caller to report on the progress of a current snapshot being uploaded and to report when the snapshot is complete. For example, after the caller creates a snapshot on the remote data store 214 via the create snapshot API, the caller may use the snapshot progress API to report to the block storage service 240 what percentage of the snapshot has been uploaded to the remote data store 214 via the upload block API. Note that additional data cannot be uploaded to a snapshot via the upload block API once the snapshot has been reported to be complete via the snapshot progress API. In at least some embodiments, after a snapshot is complete, the snapshot and its manifest are immutable.

The snapshot progress API may be used asynchronously or synchronously during the upload to snapshot to report snapshot progress to the block storage service 240. For example, the caller (a client application) may be configured to send a snapshot progress message via the APIs 242 periodically or aperiodically to the block storage service 240. As another example, the client application may be configured to send a snapshot progress message to the block storage service 240 at percentage intervals (e.g., 10%, 20%, ..., 100%). As another example, the client application may be configured to send a snapshot progress message after every upload block call to the API, or after every N such calls. In some embodiments, instead of or in addition to the client application initiating the snapshot progress call, the APIs 242 may be configured to enable the block storage service 240 to prompt the client application for snapshot progress; the client application responds by reporting the percentage of snapshot progress.

In some embodiments, instead of or in addition to the snapshot progress API, the input parameters for the upload block API may include a snapshot progress parameter.

Snapshot Progress API Input Parameters

In at least some embodiments, input parameters to the snapshot progress API may include, but are not limited to, one or more authentication parameters, a snapshot identifier (snapshot ID), and a progress parameter.

The one or more authentication parameters may include a certificate, a private key, or some other data for authenticating the caller with the service provider. A certificate may, for example contain service client information information, for example an account ID of the service client with the service provider.

The snapshot ID parameter may be used to indicate a snapshot on remote data store 212 that corresponds to this snapshot progress call.

The progress parameter may indicate an estimate of how much of the snapshot has been uploaded. In at least some embodiments, this estimate may be indicated by a percentage, for example as a number in the range 0.0-1.0 or as a number in the range 0-100. In at least some embodiments, a maximum number (e.g., 1.0 or 100) may indicate that the snapshot is complete. Note that these ranges and numbers are given by way of example, and other methods may be used to indicate snapshot progress in some embodiments.

Snapshot Progress API Output Parameters and Exceptions

In at least some embodiments, there are no output parameters for the snapshot progress API. In at least some embodiments, indications of exceptions that may be returned to the caller by the upload block API may include an authentication failure exception, an invalid snapshot ID exception, and an invalid progress exception.

An authentication failure exception may be raised if the service provider cannot authenticate the caller according to the one or more input authentication parameters.

An invalid snapshot ID exception may be raised if the block storage service 240 cannot locate the specified snapshot or determines that the snapshot ID is invalid for some other reason (e.g., the specified snapshot exists but does not belong to the service provider, or the specified snapshot is not the earliest outstanding snapshot of the corresponding volume).

An invalid progress exception may be raised if the progress parameter indicates a value that is not valid, for example if the indicated value is less than the value indicated in the progress parameter from a previous call to the snapshot progress API for this snapshot.

Delete Volume API

A delete volume API may be provided that allows a caller to request deletion of an existing volume on remote data store 212.

Delete Volume Input Parameters

In at least some embodiments, input parameters to the delete volume API may include, but are not limited to, one or more authentication parameters and a volume identifier (volume ID).

The one or more authentication parameters may include a certificate, a private key, or some other data for authenticating the caller with the service provider. A certificate may, for example contain service client information information, for example an account ID of the service client with the service provider.

The volume ID parameter may be used to specify a volume on remote data store 212 that is to be deleted.

Delete Volume API Output Parameters and Exceptions

In at least some embodiments, there are no output parameters for the delete volume API. In at least some embodiments, indications of exceptions that may be returned to the caller by the upload block API may include an authentication failure exception and an invalid volume ID exception.

An authentication failure exception may be raised if the service provider cannot authenticate the caller according to the one or more input authentication parameters.

An invalid volume ID exception may be raised if the volume specified by the volume ID input parameter cannot be located or if the volume ID is determined to be invalid for some other reason (e.g., the specified volume does not belong to the service provider).

Delete Snapshot API

A delete snapshot API may be provided that allows a caller to request deletion of an in-progress or completed snapshot on remote data store 212.

Delete Volume Input Parameters

In at least some embodiments, input parameters to the delete snapshot API may include, but are not limited to, one or more authentication parameters and a snapshot identifier (snapshot ID).

The one or more authentication parameters may include a certificate, a private key, or some other data for authenticating the caller with the service provider. A certificate may, for example contain service client information information, for example an account ID of the service client with the service provider.

The snapshot ID parameter may be used to specify a snapshot on remote data store 212 that is to be deleted.

Delete Snapshot API Output Parameters and Exceptions

In at least some embodiments, there are no output parameters for the delete snapshot API. In at least some embodiments, indications of exceptions that may be returned to the caller by the upload block API may include an authentication failure exception and an invalid snapshot ID exception.

An authentication failure exception may be raised if the service provider cannot authenticate the caller according to the one or more input authentication parameters.

An invalid snapshot ID exception may be raised if the snapshot specified by the snapshot ID input parameter cannot be located or if the snapshot ID is determined to be invalid for some other reason (e.g., the specified snapshot does not belong to the service provider).

Applications of the Block Storage Service APIs

The following describes examples of general applications for embodiments of the block storage service and the block storage service APIs in a service provider networking environment, for example as illustrated in FIG. 4. The block storage service and APIs may be implemented on one or more devices on the service provider network and may act as an interface between various processes in service clients' data centers and a remote, block-based data store on the service provider network. The APIs to the block storage service may provide a standard interface to volume-based block storage operations on the remote data store. The service provider, the service clients, and/or third parties may develop and provide various applications and/or appliances that may, for example, be instantiated in service clients' local networks and that leverage the block storage service via the APIs to create and manage volumes and snapshots on the remote data store provided by the service provider. These applications and appliances may include, for example, relatively simple programs that are designed to create a volume and upload data from a data source to the volume, applications or appliances that leverage the APIs to utilize the remote data store provided by the service provider as a primary data store for a service client's data, applications or appliances that leverage the APIs to utilize the remote data store provided by the service provider as a backup or shadowing data store for a service client's primary data store on the service client's local network. Embodiments of the block storage service and APIs may, for example, enable various entities such as third party storage device providers to develop cloud technology-backed block devices, for example Storage Area Network (SAN) storage devices and Network-Attached Storage (NAS) devices, that upload data to and download data from "cloud" storage provided by the service provider according to the block storage service APIs.

The block storage service APIs may provide a standard interface to the volume-based block storage on the remote data store that may, for example, allow different applications and/or appliances to exchange or share data through the remote data store. For example, one application on a service client network may create a volume on the remote data store and upload data to the volume according to the block storage service APIs. A snapshot of the volume may be taken on the remote data store. Another, different application or appliance that supports the block storage service APIs on the service client network or on some other network may then, with appropriate data access permissions, access data from the volume and/or snapshot in accordance with the block storage service APIs.

The block storage service APIs may be implemented according to different technologies including but not limited to Simple Object Access Protocol (SOAP) technology and Representational state transfer (REST) technology. In other words, the block storage service APIs may be, but are not necessarily, implemented as SOAP APIs or RESTful APIs. The block storage service APIs may be wrapped with client libraries in various languages including but not limited to C, C++, Java, C#, and Perl to support integration with the block storage service.

Figure 9:
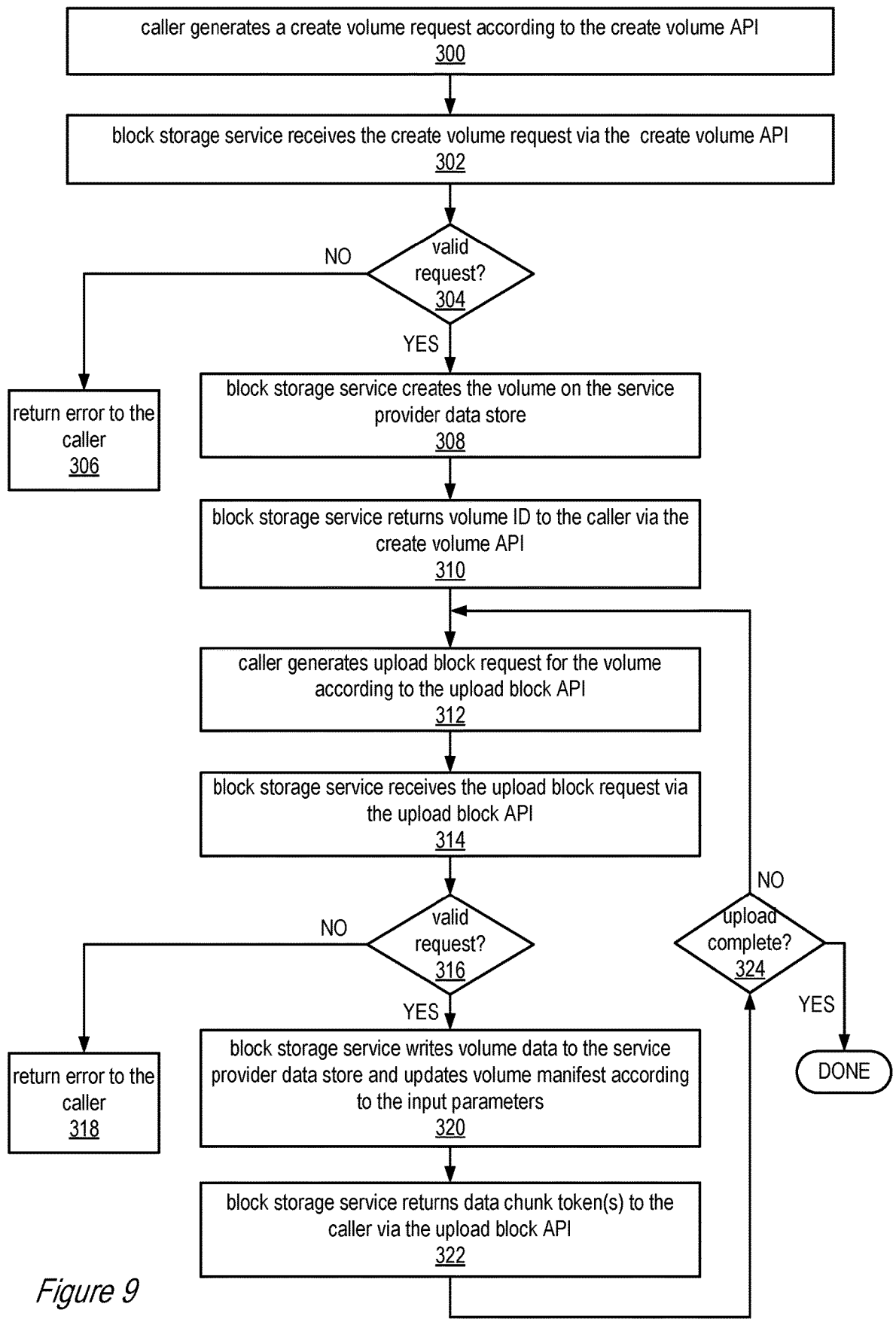
FIG. 9 is a flowchart that illustrates creating a volume and uploading data to the volume according to the block storage service APIs, according to at least some embodiments.

FIG. 9 is a flowchart that illustrates creating a volume and uploading data to the volume according to the block storage service APIs, according to at least some embodiments. As indicated at 300, a caller (e.g., a local application on a service client's network) generates a create volume request according to the create volume API and sends the request to the block storage service according to the create volume API. In at least some embodiments, the create volume request may include one or more authentication parameters, an optional volume size parameter, an optional snapshot identifier (snapshot ID), and an idempotency key. As indicated at 302, the block storage service receives the create volume request via the create volume API. At 304, the block storage service may examine one or more parameters of the create volume request to determine if the request is valid. If the create volume request is not valid, then the block storage service may return an error to the caller via the create volume API, as indicated at 306. In at least some embodiments, errors that may be returned to the caller by the create volume API may include an authentication failure error, an invalid volume size error, an invalid snapshot ID error, and an invalid volume ID error. At 304, if the create volume request is valid, the block storage service creates the volume on the volume-based block storage provided by the service provider according to the parameters indicated by the create volume request, as indicated at 308. In at least some embodiments, the block storage service may also take an initial snapshot of the volume on the service provider data store. In at least some embodiments, the block storage service creates a manifest for the volume. A volume manifest may include volume information such as a service client identifier (e.g., an account identifier (ID)), a volume identifier (volume ID) unique to this volume, timestamps, and so on. A volume manifest may also include entries that map chunks of volume data to locations in the service provider data store. Each entry in the manifest may also include a field that indicates the creator/owner of the respective chunk, which will typically but not always be an account identifier of the service client that owns this volume. In at least some embodiments, a snapshot manifest may also be created for the initial snapshot, if created. Note that volumes and their corresponding volume manifests are mutable. However, snapshots and their corresponding snapshot manifests are immutable. As indicated at 310, the block storage service returns at least the volume ID to the caller via the create volume API. In at least some embodiments, an initial snapshot ID may also be returned.

As indicated at 312, after the caller receives the volume ID from the service provider via the create volume API, the caller may generate an upload block request for the volume according to the upload block API. In at least some embodiments, an upload block request to upload data to a volume may include, but is not limited to, one or more authentication parameters, a volume identifier (volume ID), a compressed parameter, and, for each of one or more data blocks being uploaded, a data offset, a data length, a checksum, and the data to be uploaded. As indicated at 314, the block storage service receives the upload block request via the upload block API. At 316, the block storage service may examine one or more parameters of the upload block request to determine if the request is valid. If the upload block request is not valid, then the block storage service may return an error to the caller via the upload block API, ad indicated at 318. In at least some embodiments, errors that may be returned to the caller by the upload block API for a volume may include an authentication failure error, an invalid volume ID error, and a checksum error. At 316, if the upload block request is valid, the block storage service writes the volume data indicated by the request to the service provider data store according to the input parameters, as indicated at 320. In at least some embodiments, the block storage service also updates the respective volume manifest.

As indicated at 322, the block storage service returns one or more data chunk tokens to the caller via the upload block API. A data chunk token is an identifier for a unit of data that was uploaded. A data chunk token may, for example, be a hash of a unit of data. Both the block storage service and the caller (e.g., a local application on a client network) may store data chunk tokens, and may use the tokens to identify data chunks in subsequent upload and/or download operations, for example in a data deduplication technique.

The caller may continue to use the upload block API to upload additional new or modified (dirty) data to the volume on the service provider data store. At 324, if the caller has completed uploading data (e.g., if all of the data to be uploaded to a volume has been uploaded), then the upload is complete. Otherwise, the method may return to element 312.

As further described below, one or more techniques for accelerating data uploads may be employed in the data upload process for a volume as described above. For example, a data deduplication technique and/or a data compression technique may be used.

Figure 10:
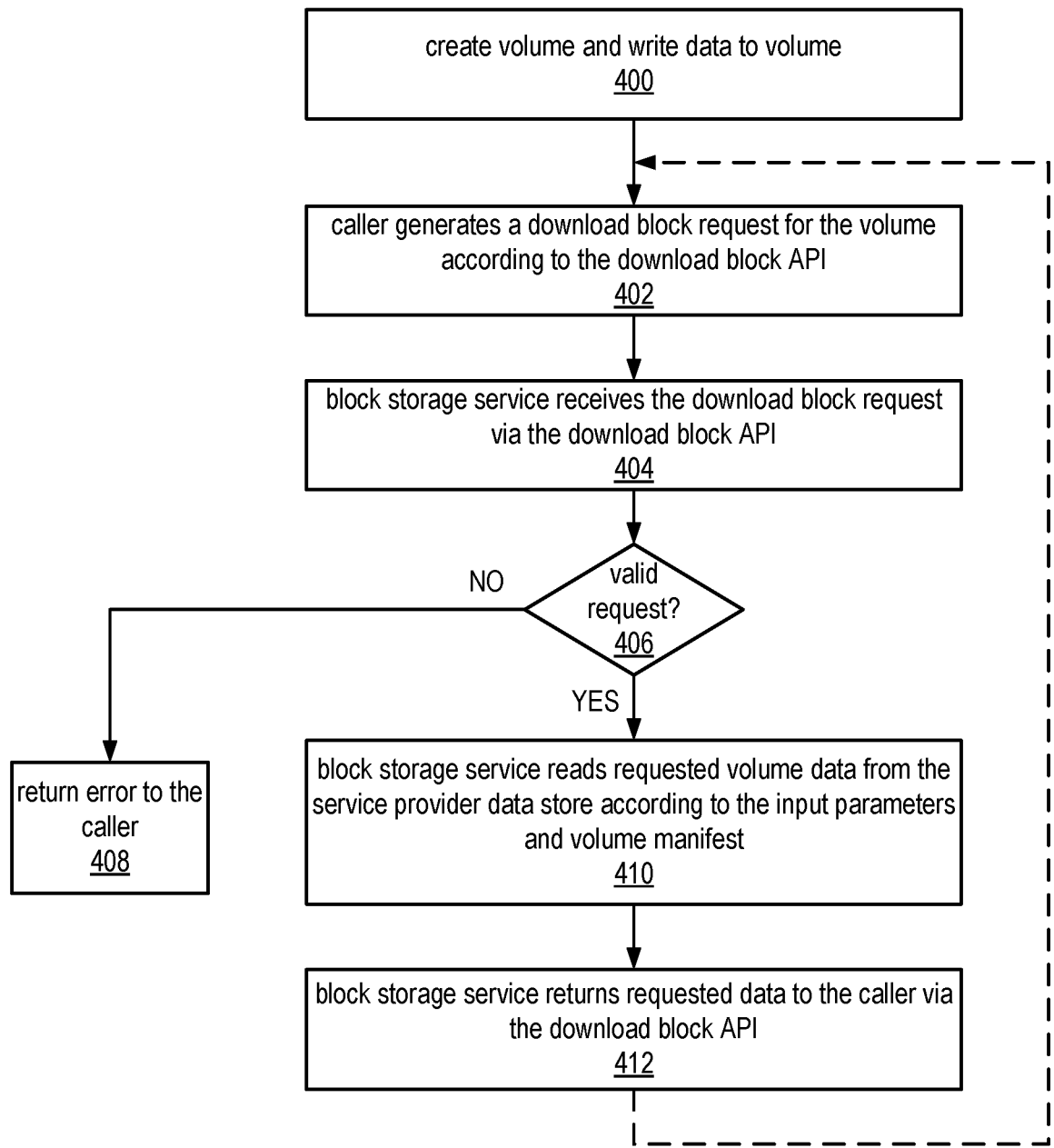
FIG. 10 is a flowchart that illustrates downloading data from a volume on a service provider data store using the block storage service APIs, according to at least some embodiments.

FIG. 10 is a flowchart that illustrates downloading data from a volume on a service provider data store using the block storage service APIs, according to at least some embodiments. This method may be used, for example, to create a local copy of at least a portion of a volume on a local data store, or to access data from a volume on the remote data store being used as a primary data store on demand (e.g., upon request by a client process on the service client's local network). As indicated at 400, a volume may be created on the service provider data store, and data may be written to the volume. For example, a volume may be created and data may be uploaded to the volume from a service client's network using a technique as illustrated in FIG. 9. As another example, the volume may be a boot image corresponding to a machine image instance of the service client that is instantiated on the service provider network according to hardware virtualization technology provided by the service provider. As another example, the volume may be a volume that was created by another entity (e.g., another service client, or another service client data center) to which this service client or service client data center has been given permission to download/copy to local storage. As another example, the volume may be a volume that was created from a snapshot on the remote data store. In general, the volume may be any volume on the service provider's remote data store to which this service client has or has been granted export permission.

As indicated at 402, a caller may generate a download block request for the volume according to the download block API. In at least some embodiments, a download block request to download data from a volume may include, but is not limited to, one or more authentication parameters, a volume identifier (volume ID), a data offset, a data length, and a compressed parameter. As indicated at 404, the block storage service receives the download block request via the download block API. At 406, the block storage service may examine one or more parameters of the download block request to determine if the request is valid. If the download block request is not valid, then the block storage service may return an error to the caller via the download block API, ad indicated at 408. In at least some embodiments, errors that may be returned to the caller by the download block API for a volume may include an authentication failure error and an invalid volume ID error. At 406, if the download block request is valid, the block storage service reads the requested volume data from the service provider data store according to the input parameters and the volume manifest as indicated at 410. As indicated at 412, the block storage service returns the requested data to the caller via the download block API. In at least some embodiments, for each of one or more data blocks being downloaded, the download block API returns a data offset, a data length, a checksum, and the data being downloaded.

As indicated by the dashed line with arrow returning from 412 to 402, the caller may, but does not necessarily, continue to use the download block API to download additional data from the volume on the service provider data store. As further described below, one or more techniques for accelerating data downloads may be employed, for example a data compression technique.

Figure 11:
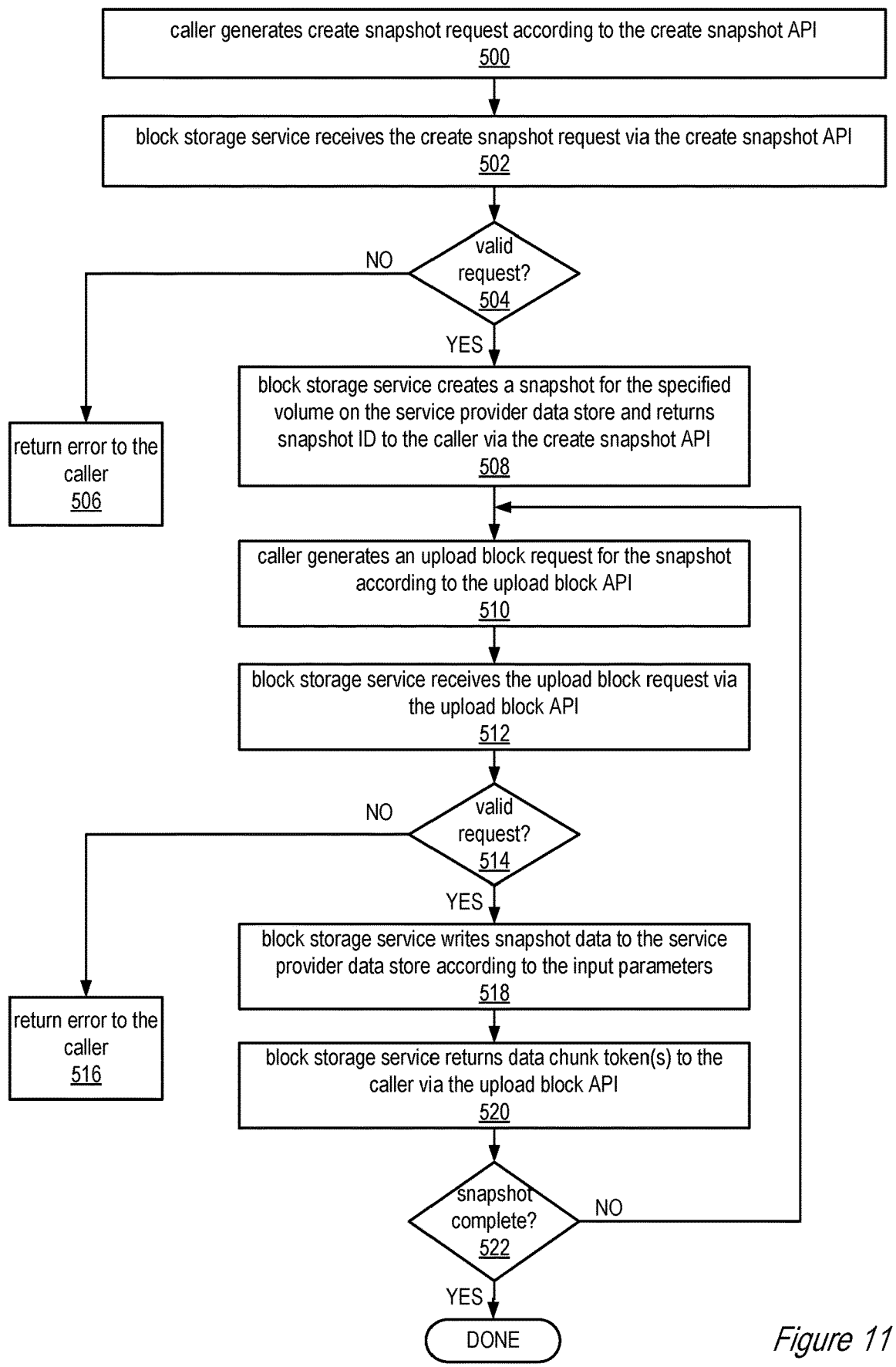
FIG. 11 is a flowchart that illustrates creating a snapshot and uploading data to the snapshot via the block storage service APIs, according to at least some embodiments.

FIG. 11 is a flowchart that illustrates creating a snapshot and uploading data to the snapshot via the block storage service APIs, according to at least some embodiments. As indicated at 500, a caller (e.g., a local application on a service client's network) generates a create snapshot request according to the create snapshot API and sends the request to the block storage service according to the create snapshot API. In at least some embodiments, the create snapshot request may include one or more authentication parameters, a volume identifier (volume ID) for a local volume of which a snapshot is to be taken, a list of data chunk tokens that each uniquely identifies a unit of data (a chunk) in the volume, and an idempotency key. As indicated at 502, the block storage service receives the create snapshot request via the create snapshot API. At 504, the block storage service may examine one or more parameters of the create snapshot request to determine if the request is valid. If the create snapshot request is not valid, then the block storage service may return an error to the caller via the create snapshot API, as indicated at 506. In at least some embodiments, errors that may be returned to the caller by the create snapshot API may include an authentication failure error, an invalid volume ID error, and an invalid chunk token error. At 504, if the create snapshot request is valid, the block storage service creates a snapshot for the specified volume on the service provider data store and returns the snapshot ID to the caller via the create snapshot API, as indicated at 508. A snapshot manifest may also be created for the snapshot.

As indicated at 510, after the caller receives the snapshot ID from the service provider via the create snapshot API, the caller may generate an upload block request for the snapshot according to the upload block API. In at least some embodiments, an upload block request to upload data to a snapshot may include, but is not limited to, one or more authentication parameters, a snapshot identifier (snapshot ID), a data version for the snapshot, a compressed parameter, and, for each of one or more data blocks being uploaded, a data offset, a data length, a checksum, and the data to be uploaded. As indicated at 512, the block storage service receives the upload block request via the upload block API. At 514, the block storage service may examine one or more parameters of the upload block request to determine if the request is valid. If the upload block request is not valid, then the block storage service may return an error to the caller via the upload block API, ad indicated at 516. In at least some embodiments, errors that may be returned to the caller by the upload block API for a snapshot may include an authentication failure error, an invalid snapshot ID error, an invalid data version error, a checksum error, and a snapshot already complete error. At 514, if the upload block request is valid, the block storage service writes the snapshot data indicated by the request to the service provider data store according to the input parameters, as indicated at 518. In at least some embodiments, the block storage service also updates the respective snapshot manifest.

As indicated at 520, the block storage service returns one or more data chunk tokens to the caller via the upload block API. A data chunk token is an identifier for a unit of data that was uploaded. A data chunk token may, for example, be a hash of a unit of data. Both the block storage service and the caller (e.g., a local application on a client network) may store data chunk tokens, and may use the tokens to identify data chunks in subsequent upload and/or download operations, for example in a data deduplication technique.

At 522, if the snapshot is not yet complete, the caller may continue to use the upload block API to upload additional data to the snapshot on the service provider data store. In at least some embodiments, a snapshot progress API may be provided that, for example, allows the caller to report on the progress of a current snapshot being uploaded and to report when the snapshot is complete. For example, after a snapshot is created on the remote data store via the create snapshot API as indicated at 500 through 508 and begins uploading data to the snapshot as indicated at 510 through 522, the caller may use the snapshot progress API to report to the block storage service what percentage of the snapshot has been uploaded to the remote data store via the upload block API. When the snapshot is complete, the snapshot progress API may be used to report to the block storage service that the snapshot has been completed. In at least some embodiments, additional data cannot be uploaded to the snapshot via the upload block API once the snapshot has been reported to be complete via the snapshot progress API. In at least some embodiments, the block storage service treats a completed snapshot and its manifest as immutable.

The snapshot progress API may be used asynchronously or synchronously during the upload to snapshot to report snapshot progress to the block storage service. For example, the client application may be configured to send a snapshot progress message via the API periodically or aperiodically to the block storage service. As another example, the client application may be configured to send a snapshot progress message to the block storage service at percentage intervals (e.g., 10%, 20%, . . . , 100%). As another example, the client application may be configured to send a snapshot progress message after every upload block call to the API, or after every N such calls. In some embodiments, instead of or in addition to the client application initiating the snapshot progress call, the snapshot progress API may be configured to enable the block storage service to prompt the client application for snapshot progress; the client application responds by reporting the percentage of snapshot progress.

As further described below, one or more techniques for accelerating data uploads may be employed in the data upload process for a snapshot as described above. For example, a data deduplication technique and/or a data compression technique may be used.

Figure 12:
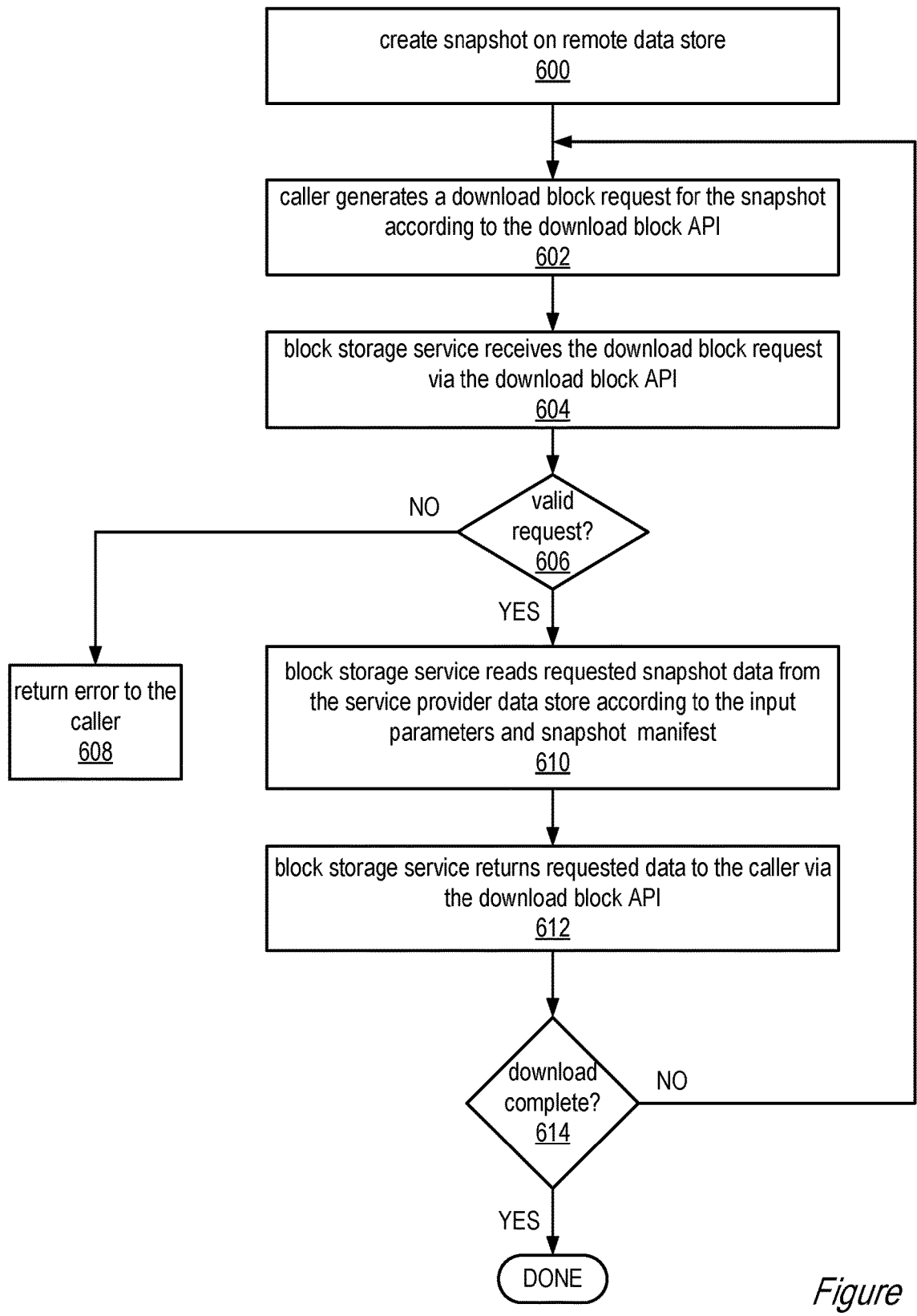
FIG. 12 is a flowchart that illustrates downloading data from a snapshot on a service provider data store using the block storage service APIs, according to at least some embodiments.

FIG. 12 is a flowchart that illustrates downloading data from a snapshot on a service provider data store using the block storage service APIs, according to at least some embodiments. This method may, for example, be used in creating or restoring a local volume or a portion thereof from a snapshot on the remote data store. As indicated at 600, a snapshot may be created on the service provider data store. For example, a snapshot may be created and data may be uploaded to the snapshot from a volume on the service client's network using a technique as illustrated in FIG. 11. As another example, the snapshot may be a snapshot of a boot image corresponding to a machine image instance of the service client that is instantiated on the service provider network according to hardware virtualization technology provided by the service provider. As another example, the snapshot may be a snapshot of a volume that was created by another entity (e.g., another service client, or another service client data center) to which this service client or service client data center has been given permission to export to local storage. In general, the snapshot may be a snapshot of any volume on the service provider's remote data store to which this service client has or has been granted export permission, or a snapshot of any volume on an external network to the service provider network (including but not limited to the requesting service client's network) to which this service client has or has been granted export permission.

U.S. patent application Ser. No. 13/324,907, titled "METHODS AND APPARATUS FOR CONTROLLING SNAPSHOT EXPORTS," which was previously incorporated by reference in its entirety, describes methods and apparatus that may be used to control the downloading of snapshots of volumes according to export rights of the service clients. In these methods, for example, a request may be received from a service client to access one or more snapshots, for example a request to export the snapshot or a request for a listing of snapshots. For each snapshot, the service provider may determine if the service client has rights to the snapshot, for example by checking a manifest for the snapshot to see if entries in the snapshot manifest belong to accounts to which this service client has export permission and/or if the service client has export permission for the respective volume corresponding to the snapshot. If the service client has export rights for a snapshot, the request is granted; otherwise, the request is not granted. In particular, U.S. patent application Ser. No. 13/324,907 _describes a snapshot export control service that may be accessed by the block storage service to determine a service client's access permissions for snapshots specified by the service client via the block storage service APIs, for example snapshots specified via the download block API.

As indicated at 602, a caller may generate a download block request for the snapshot according to the download block API. In at least some embodiments, a download block request to download data from a snapshot may include, but is not limited to, one or more authentication parameters, a snapshot identifier (snapshot ID), a data offset, a data length, and a compressed parameter. As indicated at 604, the block storage service receives the download block request via the download block API. At 606, the block storage service may examine one or more parameters of the download block request to determine if the request is valid. If the download block request is not valid, then the block storage service may return an error to the caller via the download block API, ad indicated at 608. In at least some embodiments, errors that may be returned to the caller by the download block API for a volume may include an authentication failure error and an invalid snapshot ID error. At 606, if the download block request is valid, the block storage service reads the requested snapshot data from the service provider data store according to the input parameters and the snapshot manifest as indicated at 610. As indicated at 612, the block storage service returns the requested snapshot data to the caller via the download block API. In at least some embodiments, for each of one or more data blocks being downloaded, the download block API returns a data offset, a data length, a checksum, and the data being downloaded.

The caller may continue to use the download block API to download additional data from the snapshot on the service provider data store. At 614, if all data from the snapshot has been downloaded, then the download is complete. Otherwise, the method may return to element 602.

As further described below, one or more techniques for accelerating data downloads may be employed, for example a data compression technique.

Data Transfer Acceleration Techniques

Figure 13:
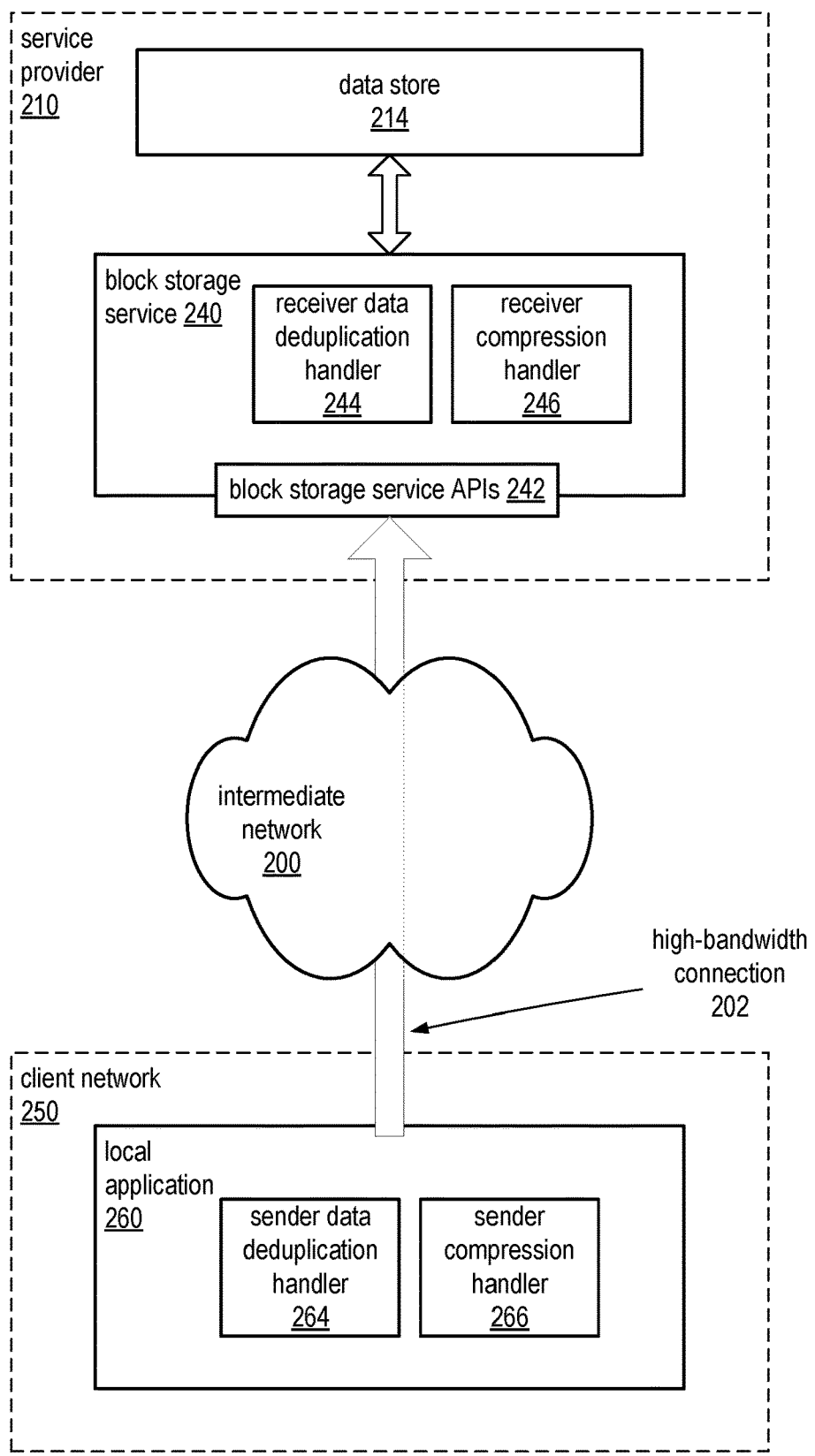
FIG. 13 is a block diagram that illustrates sender-side and receiver-side handlers that may implement one or more techniques for accelerating the transfer of data in data uploads to the remote data store using the block storage service and block storage service APIs, according to at least some embodiments.

Embodiments of the block storage service and APIs to the block storage service may implement or support one or more techniques for accelerating the transfer of data (data uploads and/or data downloads) between the block storage service and applications and/or appliances that leverage the block storage service APIs to create and manage volumes and snapshots on remote, volume-based block storage provided by the service provider. The accelerated data techniques may, for example, include techniques that reduce the amount of data that is uploaded and/or downloaded using the data upload and data download API techniques described herein. This accelerated data movement, as compared to a standard Internet connection, may, for example, be achieved using one or more of data deduplication, compression, and parallelization FIG. 13 is a block diagram that illustrates sender-side and receiver-side handlers that may implement one or more techniques for accelerating the transfer of data in data uploads to the remote data store using the block storage service and block storage service APIs, according to at least some embodiments. In at least some implementations, a local application 260 communicates with the block storage service 240 according to the block storage service APIs 242 via an intermediate network 200 (e.g., the Internet). In at least some implementations, the coupling of the local application 260 to the intermediate network 200 may be via a high-bandwidth connection 202 provided by the service client's network 250, as large amounts of data may be transferred across the intermediate network 200 between local application 260 and block storage service 240. For example, at peak times, the connection may need to support the transfer of data at rates of 100 megabits/second (100 Mbit/s) or higher. However, in at least some embodiments, techniques including but not limited to a data deduplication technique and a compression technique may be employed to reduce bandwidth usage when uploading data from local application 260 to block storage service 240, and thus more of the connection's bandwidth may be available for other applications.

FIG. 13 shows a receiver data deduplication handler 244 and a receiver compression handler 246 implemented by the block storage service 240. In at least some embodiments, these handlers may implement data deduplication and compression techniques that are made available to service clients via the block storage service APIs 242. A developer of a local application 260 may implement sender-side logic (e.g., sender data deduplication handler 264 and sender compression handler 266) in the local application 260 to leverage these data acceleration techniques if necessary or desired.

Example data deduplication techniques that may be employed in at least some embodiments are described in U.S. patent application Ser. No. 12/981,393, titled "RECEIVER-SIDE DATA DEDUPLICATION IN DATA SYSTEMS," which is hereby incorporated by reference in its entirety, and in U.S. patent application Ser. No. 12/981,397, titled "REDUCED BANDWIDTH DATA UPLOADING IN DATA SYSTEMS," which is hereby incorporated by reference in its entirety. In the example data deduplication techniques, the receiver (the block storage service 240), rather than the sender (the local application 260), maintains tokens, for example as a fingerprint dictionary, for previously uploaded data. When the sender has additional data to be uploaded, the sender extracts tokens (fingerprints) for units of the data and sends the fingerprints to the receiver. The receiver checks its fingerprint dictionary to determine the data units to be uploaded and notifies the sender of the identified units, which then sends the identified units of data to the receiver. However, note that other data deduplication techniques may be employed in some embodiments.

While FIG. 13 illustrates sender- and receiver-side handlers that may implement one or more techniques for accelerating the transfer of data in data uploads from the client network 250 to the remote data store 214 using the block storage service APIs 242, specifically the upload block API, note that similar techniques may be used to accelerate data transfers using the download block API to download data from the remote data store 214 to the client network 250.

One or more of a variety of data compression techniques may be used. As noted above in the description of the block storage service APIs, the upload block and download block APIs may each provide a compressed parameter that may be used to indicate if the data in a respective block is or is not compressed according to the compression technique.

Example Use Cases

A wide variety of applications and appliances may be developed that leverage the block storage service APIs as described herein to take advantage of the remote, volume-based block storage service provided by the service provider. The following describes some example use cases. Note that these examples are not intended to be limiting.

Import/Export Utility

A service client or third party may develop an application that may be used on a service client's network to export data to volumes on the service provider's remote data store and/or to import data from the remote data store to volumes on a local data store.

FIG. 7 broadly illustrates data flow for an export function, according to at least some embodiments. For the export function, an application may take as input an existing volume ID on the remote data store 214 to which data is to be exported. Alternatively, the application may create a volume to export the data to according to the create volume API. The application may also take as input a local data source 280. The local data source 280 may, for example, be a volume on a local data store, or some other data source such as a tape, a disk, a file, etc. The local data source 280 may be, but is not necessarily, a block format data source. The application may then use the upload block API to upload data blocks to the volume on the remote data store 214, for example as illustrated at elements 312 through 322 of FIG. 9. Note that the application is responsible for formatting the data according to the block format used by the block storage service 240 and block storage service APIs 242, if necessary.

FIG. 8 broadly illustrates data flow for an import function, according to at least some embodiments. For the import function, an application may take as input an existing volume ID on the remote data store 214 from which data is to be imported. The application may also take as input a local data destination 282. The local data destination 282 may, for example, be a volume on a local data store, or some other data destination such as a tape, a disk, a file, etc. The local data destination 282 may be, but is not necessarily, a block format data destination. The application may then use the download block API to download data blocks from the volume on the remote data store 214, for example as illustrated at elements 402 through 412 of FIG. 10. Note that the application is responsible for formatting the data according to the format used by the local data destination 282, if necessary.

Primary Data Store

Figure 14:
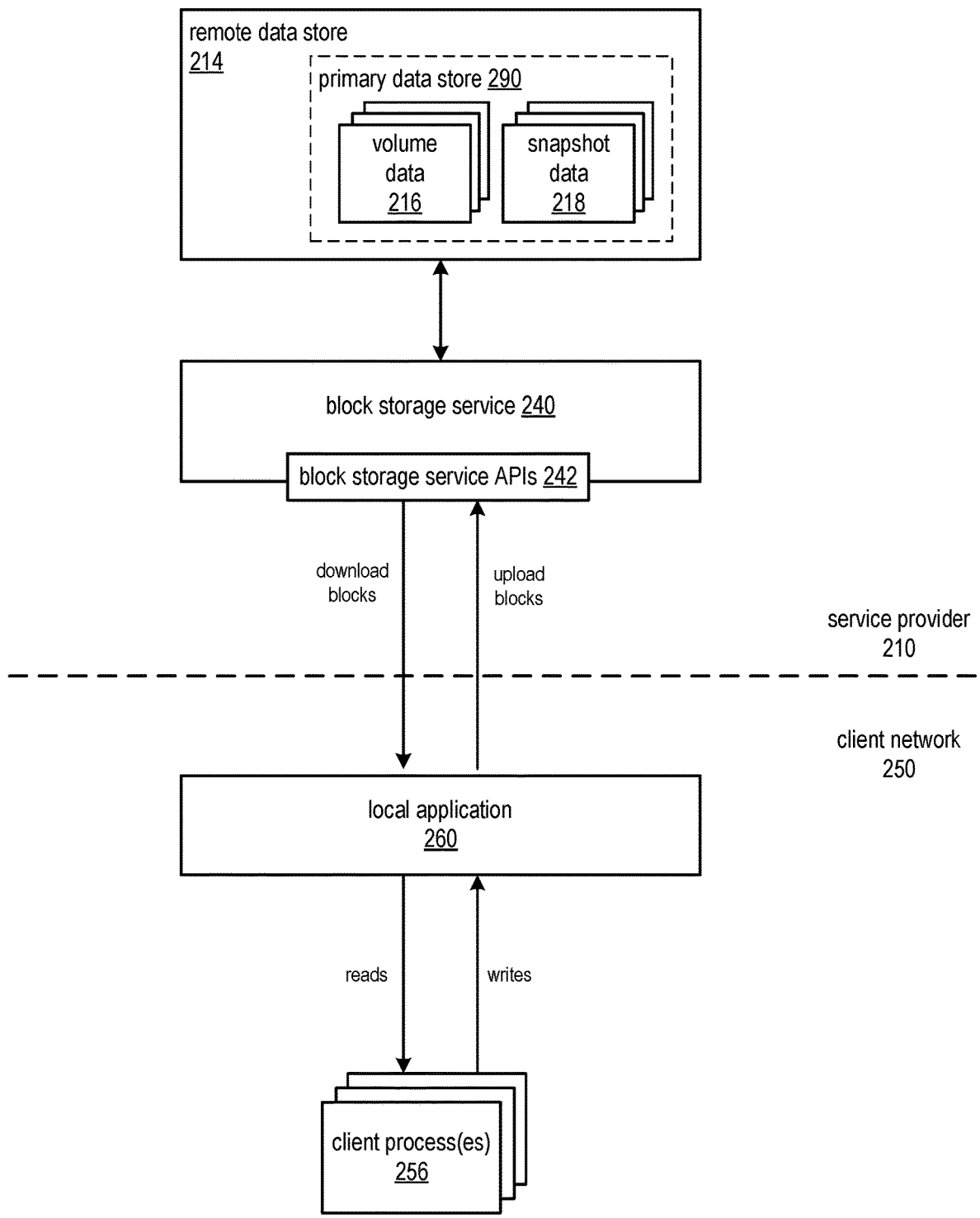
FIG. 14 is a high-level block diagram that broadly illustrates a local application that leverages the block storage service APIs to provide a primary data store on the remote, volume-based block storage, according to at least some embodiments.

A service client or third party may develop an application or appliance that may be used on a service client's network to leverage the remote, volume-based block storage service provided by the service provider as a primary storage for the service client's data via the block storage service APIs. FIG. 14 is a high-level block diagram that broadly illustrates a local application that leverages the block storage service APIs to provide a primary data store on the remote, volume-based block storage, according to at least some embodiments. A local application 260 or appliance may be developed that appears as a local data target (e.g., an iSCSI target) to client processes 256 on the client network 250. The client processes 256 may make read and write I/O requests to the local application 260 or appliance. The local application 260 or appliance uploads data from the write requests to volume(s) on the remote data store 214 and downloads data from volume(s) on the remote data store 214 for the read requests according to the block storage service APIs, for example as illustrated in FIGS. 7, 8, and 13. The local application 260 may support the create volume API, the create snapshot API, the upload block and download block APIs, and also may support one or more other APIs provided via the block storage service APIs such as delete volume and delete snapshot APIs.

Backing Data Store

Figure 15:
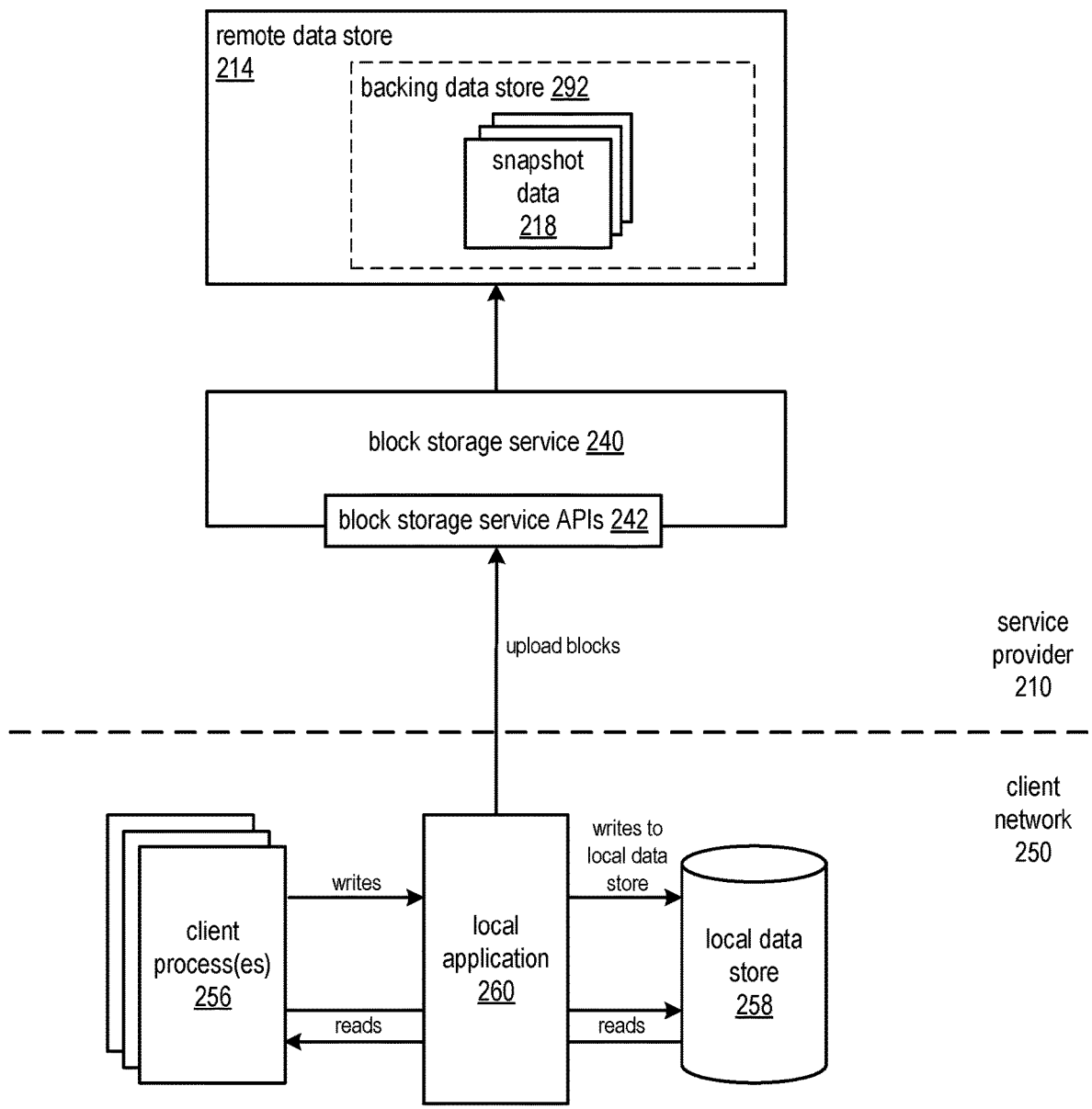
FIG. 15 is a high-level block diagram that broadly illustrates a local application that leverages the block storage service APIs to provide a backing data store on the remote, volume-based block storage, according to at least some embodiments.

A service client or third party may develop an application or appliance that may be used on a service client's network to leverage the remote, volume-based block storage service provided by the service provider as a backing data store for the service client's primary data store via the block storage service APIs. FIG. 15 is a high-level block diagram that broadly illustrates a local application that leverages the block storage service APIs to provide a backing data store on the remote, volume-based block storage, according to at least some embodiments. A local application 260 or appliance may be developed that appears as a local data target (e.g., an iSCSI target) to client processes 256 on the client network 250. The client processes 256 may make read and write I/O requests to the local data store 258 via the local application. Read requests from the client processes 256 received by the local application 260 are passed on to the local data store 256 that serves as the primary data store. Write requests from the client processes 256 received by the local application 260 are passed on to the local data store 256, and are also shadowed to the backing data store 292 on remote data store 214 according to the upload block API. The shadowed data may be stored on remote data store 214 as snapshot data 218. The local application 260 may support the create volume API, the create snapshot API, the upload block and download block APIs, and also may support one or more other APIs provided via the block storage service APIs such as delete volume and delete snapshot APIs. For example, the local application 260 may enable restore of a volume on local data store 258 from a snapshot on remote data store 214 via the block storage service APIs.

When local application 260 initiates or resumes operations on the client network 250, there may be data in the local data store 258 that is not reflected in the backing data store 292 on the remote data store 216. Thus, local application 260 may implement a bootstrapping process during which at least some data from the local data store 258 may be uploaded to the remote data store 214 according to the block storage service APIs so that the snapshot(s) in the backing data store 292 can be populated and/or updated to accurately reflect the data that is currently on the local data store 258.

Illustrative System

Figure 16:
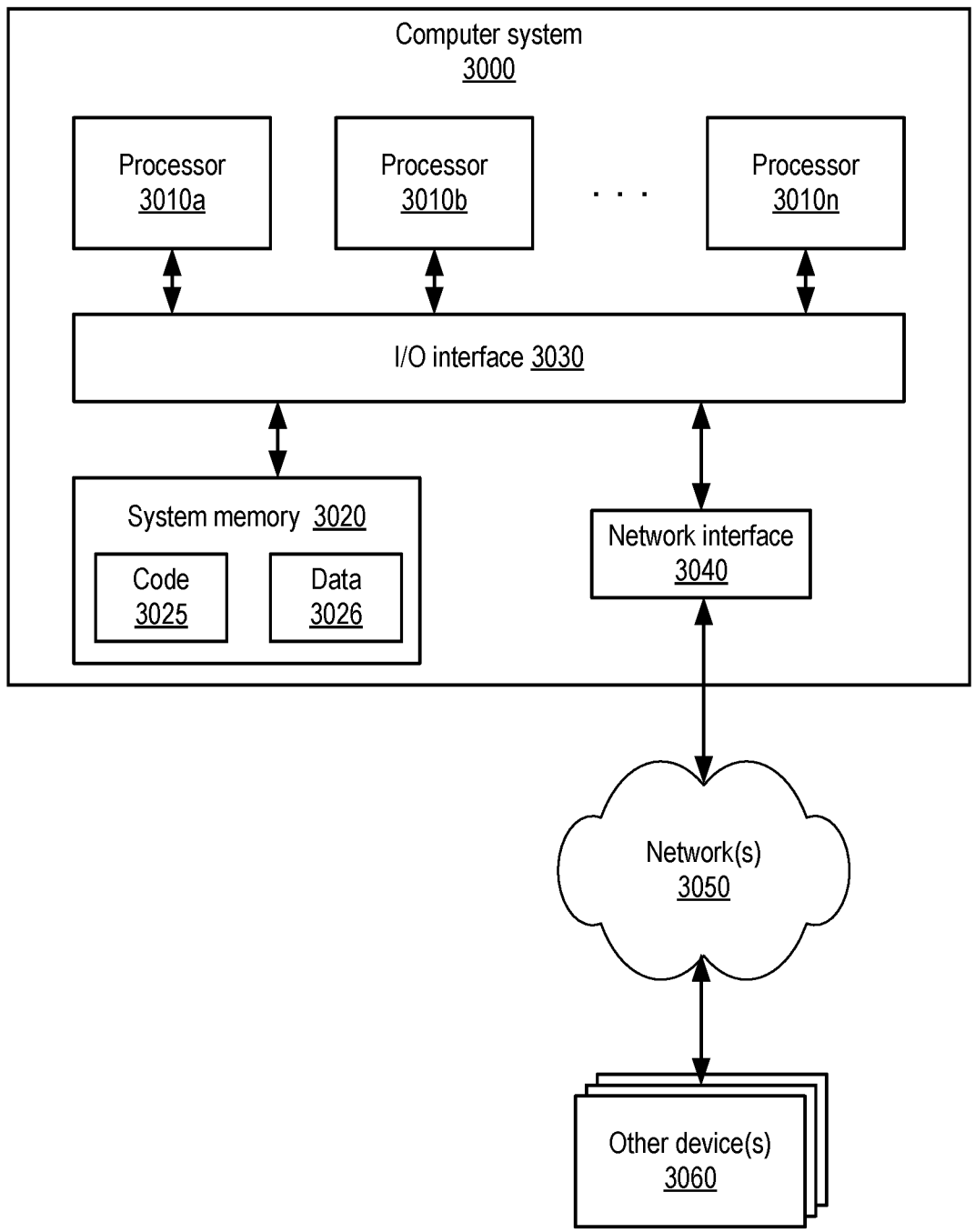
FIG. 16 is a block diagram illustrating an example computer system that may be used in some embodiments.

In at least some embodiments, a computer system that implements a portion or all of one or more of the technologies described herein, including but not limited to a block storage service and APIs to the block storage service, may include a general-purpose computer system that includes or is configured to access one or more computer-accessible media, such as computer system 3000 illustrated in FIG. 16. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a block storage service and APIs to the block storage service, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in the other Figures described herein, for example. In various embodiments, network interface 3040 may support communication via any suitable wired or wireless general data networks, such as types of Ethernet network, for example.

Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above in reference to the other Figures for implementing embodiments of a block storage service and APIs to the block storage service. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   exposing, by a block storage service implemented on one or more devices within a provider network, block storage service application programming interfaces (APIs) to clients external to the provider network, wherein the provider network provides volume-based block storage to clients external to the provider network, wherein the block storage service APIs provide an application programming interface for volume-based block storage operations of the block storage service, and wherein the block storage service APIs include a create volume API, and an upload block API; and
   performing, by the block storage service:
      receiving, from a client external to the provider network, a create volume request according to the create volume API;
      creating, within the provider network, a volume according to the create volume API and according to one or more parameters of the create volume request;
      returning, to the application, a create volume response according to the create volume API that indicates a volume identifier (ID) for the volume;
      receiving, from the client external to the provider network, one or more upload block requests according to the upload block API, wherein each upload block request specifies the volume ID and data to be uploaded to the volume; and
      for each of the one or more upload block requests, writing the respective data to the volume within the provider network according to the upload block API;
      wherein one or more of the create volume API, or upload block API include one or more API input parameters comprising one or more authentication parameters for authenticating a caller with the block storage service for at least the corresponding API.

2. The method as recited in claim 1, wherein the one or more create volume API input parameters include:
   the one or more authentication parameters for authenticating the caller with the block storage service,
   an optional volume size parameter for specifying a size for the volume to be created, and
   an optional snapshot identifier (ID) for specifying a snapshot from which the volume is to be created.

3. The method as recited in claim 1, wherein the block storage service APIs further include a create snapshot API, wherein a snapshot is a point-in-time capture of a volume, and wherein the method further comprises performing, by the block storage service:
   receiving, from the application, a create snapshot request according to the create snapshot API;
   creating a snapshot according to one or more parameters of the create snapshot request;
   returning, to the application, a create snapshot response according to the create snapshot API that indicates a snapshot identifier (ID) for the snapshot;
   receiving, from the application, one or more upload block requests according to the upload block API, wherein each upload block request specifies the snapshot ID and data to be uploaded to the snapshot; and
   for each of the one or more upload block requests, writing the respective data as snapshot data for the respective snapshot according to one or more parameters of the upload block request.

4. The method as recited in claim 3, wherein the one or more create snapshot API input parameters include:
   the one or more authentication parameters for authenticating the caller with the block storage service,
   a volume identifier (ID) that specifies a volume for which a snapshot is to be created, and
   a list of data chunk tokens, where each data chunk token identifies a unit of data in the respective volume.

5. The method as recited in claim 3, wherein, for uploading data to a snapshot, the one or more upload block API input parameters include:
   the one or more authentication parameters for authenticating the caller with the block storage service, a snapshot identifier (ID) that specifies a snapshot to which data is being uploaded,
a data version parameter that specifies a version for the snapshot,
a compressed parameter that indicates if the respective data is compressed, and,
for each of one or more data blocks being uploaded:
a data offset into the snapshot at which respective data is to be stored,
a data length of the respective data,
a checksum of the respective data, and
the respective data.

6. The method as recited in claim 1, wherein, for uploading data to a volume, the one or more upload block API input parameters include:
the one or more authentication parameters for authenticating a caller with the block storage service,
a volume identifier (ID) that specifies a volume to which data is being uploaded,
a compressed parameter that indicates if the respective data is compressed, and,
for each of one or more data blocks being uploaded:
a data offset into the volume at which respective data is to be stored,
a data length of the respective data,
a checksum of the respective data, and
the respective data.

7. The method as recited in claim 1,
wherein the APIs to the block storage service include a download block API;
wherein the method further includes:
receiving, from the client external to the provider network, one or more download block requests according to the download block API, wherein each download block request specifies data to be downloaded from the volume; and
for each of the one or more download block requests, reading the specified data from the volume within the provider network and returning, to the client external to the provider network, a download block response that includes the specified data according to the download block API; and
wherein, for downloading data from a volume, one or more download block API input parameters include:
the one or more authentication parameters for authenticating a caller with the block storage service,
a volume identifier (ID) that specifies a volume from which data is to be downloaded, and,
for each of one or more data blocks to be downloaded:
a data offset parameter that indicates an offset into the volume from which data is to be downloaded,
a data length parameter that indicates a length for the data to be downloaded from the volume at the data offset, and
a compressed parameter that indicates if the respective data is to be compressed for downloading.

8. A system, comprising:
a plurality of computing devices on a provider network, each comprising at least one processor and memory, wherein the plurality of computing devices implement a block storage service of the provider network; and
application programming interfaces (APIs) to the block storage service for clients external to the provider network, wherein the APIs to the block storage service provide an application programming interface for volume-based block storage operations of the block storage service, and wherein the APIs to the block storage service include a create volume API and an upload block API;
wherein the block storage service is to:
receive, from a client external to the provider network one or more create volume requests according to the create volume API;
for at least one received create volume request:
create, within the provider network, a volume according to the create volume API and according to one or more parameters of the respective create volume request; and
return, to the respective client, a create volume response according to the create volume API that indicates a volume identifier (ID) for the volume;
receive, from the client external to the provider network, one or more upload block requests according to the upload block API, wherein each upload block request specifies a volume ID and data to be uploaded to a respective volume; and
for at least one of the upload block requests, write the respective data to the respective volume within the provider network according to the upload block API;
wherein one or more of the create volume API, or the upload block API include one or more API input parameters comprising one or more authentication parameters for authenticating a caller with the block storage service for at least the corresponding API.

9. The system as recited in claim 8, wherein one or more create volume API input parameters include:
the one or more authentication parameters for authenticating the caller with the block storage service,
an optional volume size parameter for specifying a size for the volume to be created, and
an optional snapshot identifier (ID) for specifying a snapshot from which the volume is to be created.

10. The system as recited in claim 8, wherein the block storage service APIs further include a create snapshot API, wherein a snapshot is a point-in-time capture of a volume, and wherein the block storage service is to:
receive, from the application, a create snapshot request according to the create snapshot API;
create a snapshot according to one or more parameters of the create snapshot request;
return, to the application, a create snapshot response according to the create snapshot API that indicates a snapshot identifier (ID) for the snapshot;
receive, from the application, one or more upload block requests according to the upload block API, wherein each upload block request specifies the snapshot ID and data to be uploaded to the snapshot; and
for each of the one or more upload block requests, write the respective as snapshot data for the respective snapshot according to one or more parameters of the upload block request.

11. The system as recited in claim 10, wherein the one or more create snapshot API input parameters include:
a volume identifier (ID) that specifies a volume for which a snapshot is to be created, and
a list of data chunk tokens, where each data chunk token identifies a unit of data in the respective volume.

12. The system as recited in claim 10, wherein, for upload of data to a snapshot, the one or more upload block API input parameters include:
a snapshot identifier (ID) that specifies a snapshot to which data is being uploaded, a data version parameter that specifies a version for the snapshot, a compressed parameter that indicates if the respective data is compressed, and, for each of one or more data blocks being uploaded:
- a data offset into the snapshot at which respective data is to be stored,
- a data length of the respective data,
- a checksum of the respective data, and
- the respective data.

13. The system as recited in claim 10, further comprising a download block API, wherein, for download of data from a snapshot, one or more download block API input parameters include:

a snapshot identifier (ID) that specifies a snapshot from which data is to be downloaded, and, for each of one or more data blocks to be downloaded:
- a data offset parameter that indicates an offset into the snapshot from which data is to be downloaded,
- a data length parameter that indicates a length for the data to be downloaded from the snapshot at the data offset, and
- a compressed parameter that indicates if the respective data is to be compressed for downloading.

14. The system as recited in claim 8, wherein, for upload of data to a volume, the one or more upload block API input parameters include:

the one or more authentication parameters for authenticating a caller with the block storage service, a volume identifier (ID) that specifies a volume to which data is being uploaded, a compressed parameter that indicates if the respective data is compressed, and, for each of one or more data blocks being uploaded:
- a data offset into the volume at which respective data is to be stored,
- a data length of the respective data,
- a checksum of the respective data, and
- the respective data.

15. One or more non-transitory computer-readable storage media storing program instructions that when executed on or across one or more processors:

implement application programming interfaces (APIs) to a block storage service of a provider network for clients external to the provider network, wherein the APIs to the block storage service provide an application programming interface for volume-based block storage operations of the block storage service, and wherein the APIs to the block storage service include a create volume API, and an upload block API;

receive, from a client external to the provider network, one or more create volume requests according to the create volume API;

for at least one received create volume request:
  create, within the provider network, a volume according to the create volume API and according to one or more parameters of the respective create volume request; and
  return, to the respective client a create volume response according to the create volume API that indicates a volume identifier (ID) for the volume;

receive, from the client external to the provider network, one or more upload block requests according to the upload block API, wherein each upload block request specifies a volume ID and data to be uploaded to a respective volume; and for at least one of the upload block requests, write the respective data to the respective volume within the provider network according to the upload block API;

wherein one or more of the create volume API, or the upload block API include one or more API input parameters comprising one or more authentication parameters for authenticating a caller with the block storage service for at least the corresponding API.

16. The one or more non-transitory computer-readable storage media as recited in claim 15, wherein one or more create volume API input parameters include:

the one or more authentication parameters for authenticating the caller with the block storage service, an optional volume size parameter for specifying a size for the volume to be created, and an optional snapshot identifier (ID) for specifying a snapshot from which the volume is to be created.

17. The one or more non-transitory computer-readable storage media as recited in claim 15, wherein the block storage service APIs further include a create snapshot API, wherein a snapshot is a point-in-time capture of a volume, and wherein media further stores program instructions executable to:

receive, from the application, a create snapshot request according to the create snapshot API;

create a snapshot according to one or more parameters of the create snapshot request;

return, to the application, a create snapshot response according to the create snapshot API that indicates a snapshot identifier (ID) for the snapshot;

receive, from the application, one or more upload block requests according to the upload block API, wherein each upload block request specifies the snapshot ID and data to be uploaded to the snapshot; and for each of the one or more upload block requests, write the respective data as snapshot data for the respective snapshot according to one or more parameters of the upload block request.

18. The one or more non-transitory computer-readable storage media as recited in claim 17, wherein the one or more create snapshot API input parameters include:

one or more authentication parameters for authenticating the caller with the block storage service, a volume identifier (ID) that specifies a volume for which a snapshot is to be created, and a list of data chunk tokens, where each data chunk token identifies a unit of data in the respective volume.

19. The one or more non-transitory computer-readable storage media as recited in claim 17, wherein, for upload of data to a snapshot, the one or more upload block API input parameters include:

one or more authentication parameters for authenticating the caller with the block storage service, a snapshot identifier (ID) that specifies a snapshot to which data is being uploaded, a data version parameter that specifies a version for the snapshot, a compressed parameter that indicates if the respective data is compressed, and, for each of one or more data blocks being uploaded:
- a data offset into the snapshot at which respective data is to be stored,
- a data length of the respective data,
- a checksum of the respective data, and
- the respective data.

20. The one or more non-transitory computer-readable storage media as recited in claim 17, comprising further program instructions that provide a download block API, wherein for download of data from a snapshot, one or more download block API input parameters include:
- one or more authentication parameters for authenticating a caller with the block storage service,
- a snapshot identifier (ID) that specifies a snapshot from which data is to be downloaded, and,
- for each of one or more data blocks to be downloaded:
  - a data offset parameter that indicates an offset into the snapshot from which data is to be downloaded,
  - a data length parameter that indicates a length for the data to be downloaded from the snapshot at the data offset, and
  - a compressed parameter that indicates if the respective data is to be compressed for downloading.

* * * * *